(12) United States Patent
Liu et al.

(10) Patent No.: US 10,779,244 B2
(45) Date of Patent: Sep. 15, 2020

(54) POWER HEADROOM TRANSMISSION METHOD AND DEVICE

(71) Applicant: Huawei Technologies Co., Ltd., Shenzhen (CN)

(72) Inventors: Fengwei Liu, Chengdu (CN); Lei Chen, Shenzhen (CN); Jing Qiu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/673,422

(22) Filed: Nov. 4, 2019

(65) Prior Publication Data

US 2020/0068506 A1   Feb. 27, 2020

Related U.S. Application Data

(63) Continuation of application No. PCT/CN2018/085593, filed on May 4, 2018.

(30) Foreign Application Priority Data

May 5, 2017  (CN) .......................... 2017 1 0314120

(51) Int. Cl.
   *H04W 52/36*   (2009.01)
   *H04J 11/00*   (2006.01)
   *H04L 27/26*   (2006.01)

(52) U.S. Cl.
   CPC ......... *H04W 52/36* (2013.01); *H04J 11/0023* (2013.01); *H04L 27/26* (2013.01); *H04J 2011/0009* (2013.01)

(58) Field of Classification Search
   CPC . H04W 52/36; H04W 52/146; H04W 52/365; H04W 52/34; H04L 27/0008;
   (Continued)

(56) References Cited

U.S. PATENT DOCUMENTS 10,575,264 B2 *  2/2020  Pelletier .............. H04W 52/146
2012/0115537 A1   5/2012  Gaal et al.
(Continued)

FOREIGN PATENT DOCUMENTS

CN    103270798 A    8/2013
CN    103718624 A    4/2014
(Continued)

OTHER PUBLICATIONS

Qualcomm Incorporated, "Power control and PHR for different waveforms," 3GPP TSG RAN WG1 Meeting #88bis, R1-1705598, Spokane, USA, Apr. 3-7, 2017, 3 pages.

(Continued)

*Primary Examiner* — Thanh C Le
(74) *Attorney, Agent, or Firm* — Slater Matsil, LLP

(57) ABSTRACT

A power headroom transmission method and a device are provided. The transmission method is applied to a terminal device that supports use of two different types of waveform for data transmission, the terminal sends a first power headroom information and $\Delta_M$, wherein the first power headroom information is used to indicate power headroom of the terminal device when data is transmitted by using the first waveform, $\Delta_M$ is a difference between a first maximum power and a second maximum power of the terminal device, the first maximum is a maximum power when using the first waveform, the second maximum is a maximum power when using the second waveform.

20 Claims, 6 Drawing Sheets

(58) Field of Classification Search
CPC .. H04L 27/26; H04L 27/2636; H04J 11/0023; H04J 2011/0009
See application file for complete search history.

(56) References Cited

U.S. PATENT DOCUMENTS

| | | | |
|---|---|---|---|
| 2015/0215943 A1* | 7/2015 | Vajapeyam | H04W 52/346 |
| | | | 370/329 |
| 2016/0142976 A1 | 5/2016 | Li et al. | |
| 2017/0150525 A1* | 5/2017 | Atefi | H04W 52/0216 |
| 2018/0262998 A1* | 9/2018 | Park | H04W 52/365 |
| 2020/0037254 A1* | 1/2020 | Comsa | H04W 52/146 |
| 2020/0120619 A1* | 4/2020 | Manolakos | H04W 52/325 |

FOREIGN PATENT DOCUMENTS

| | | |
|---|---|---|
| CN | 104144447 A | 11/2014 |
| EP | 1912345 A1 | 4/2008 |
| WO | 2017035464 A1 | 3/2017 |

OTHER PUBLICATIONS

Interdigital Communications, "Power Control for NR," 3GPP TSG RAN WG1 Meeting #88bis; R1-1705437, Spokane, USA, Apr. 3-7, 2017, 3 pages.

* cited by examiner

POWER HEADROOM TRANSMISSION METHOD AND DEVICE

CROSS-REFERENCE TO RELATED APPLICATIONS

This application is a continuation of International Application No. PCT/CN2018/085593, filed on May 4, 2018, which claims priority to Chinese Patent Application No. 201710314120.2, filed on May 5, 2017. The disclosures of the aforementioned applications are hereby incorporated by reference in their entireties.

TECHNICAL FIELD

Embodiments of this application relate to the field of communications technologies, and in particular, to a power headroom transmission method and a device.

BACKGROUND

Both an orthogonal frequency division multiplexing (OFDM) waveform and a discrete Fourier transform spread orthogonal frequency division multiplexing (DFT-S-OFDM) waveform are typical waveforms in wireless communications. The OFDM waveform can be used to provide a higher capacity in a scenario in which a signal-to-noise ratio is high, and is applicable to a cell center user. In contrast, the DFT-S-OFDM waveform characterized by a relatively low peak-to-average power ratio (PAPR) can be used to provide a wider coverage area, and is applicable to a cell edge user with limited coverage.

Currently, the new generation wireless communication (NR) standard of the 3rd Generation Partnership Project (3GPP) stipulates that both the OFDM waveform and the DFT-S-OFDM waveform are used in an uplink for data transmission. Correspondingly, a terminal device needs to support both the OFDM waveform and the DFT-S-OFDM waveform, and a network device needs to obtain power headroom (PH) information of the terminal device when data is transmitted by using the OFDM waveform and obtain PH information of the terminal device when data is transmitted by using the DFT-S-OFDM waveform, so that the network device implements resource scheduling and power control for the terminal device based on the two types of PH information. PH is defined as a difference between a maximum transmit power of the terminal device and a calculated configuration transmit power of the terminal device.

However, in a scenario in which both the OFDM waveform and the DFT-S-OFDM waveform are used in the uplink for data transmission, currently there is no method for obtaining the two types of PH information by the network device.

SUMMARY

Embodiments of this application provide a power headroom transmission method and a device, so that in a scenario in which both an OFDM waveform and a DFT-S-OFDM waveform are used in an uplink for data transmission, for each waveform, a network device can obtain PH information of a terminal device when data is transmitted by using the waveform.

To achieve the foregoing objective, the following technical solutions are used in the embodiments of this application.

According to a first aspect, a power headroom transmission method is provided, and is applied to a terminal device that supports use of a first waveform and a second waveform for data transmission, where a type of the first waveform is different from that of the second waveform. The transmission method includes: determining, by the terminal device, first power headroom information and $\Delta_M$, where the first power headroom information is used to indicate power headroom of the terminal device when data is transmitted by using the first waveform, $\Delta_M$ is a difference between a first maximum power and a second maximum power, the first maximum power is a maximum power of the terminal device when data is transmitted by using the first waveform, and the second maximum power is a maximum power of the terminal device when data is transmitted by using the second waveform; and sending, by the terminal device, the first power headroom information and $\Delta_M$ to a network device.

There is a difference between the first maximum power and the second maximum power. After the terminal device sends the first power headroom information and $\Delta_M$ to the network device, the network device may calculate second power headroom information based on $\Delta_M$, the first power headroom information, and another related parameter, to implement scheduling performed by the network device on the terminal device. The terminal device determines and reports only the first power headroom information and $\Delta_M$, so that overheads of communications signaling between the terminal device and the network device are reduced.

Optionally, in a possible implementation of this application, $\Delta_M$ is pre-configured, or is calculated by the terminal device based on the first maximum power and the second maximum power. If $\Delta_M$ is calculated by the terminal device based on the first maximum power and the second maximum power, the terminal device further sends $\Delta_M$ to the network device.

Optionally, in another possible implementation of this application, when an uplink channel of the terminal device is transmitted without using the first waveform, if the uplink channel of the terminal device is transmitted by using the second waveform, the terminal device calculates the first power headroom information based on a scheduling parameter in case of the uplink channel of the terminal device is transmitted by using the second waveform.

The uplink channel in the embodiments of this application may be a physical uplink shared channel (PUSCH), a physical uplink control channel (PUCCH), an NR-PUSCH, or an NR-PUCCH. The NR-PUSCH represents a PUSCH in an NR system, and the NR-PUCCH represents a PUCCH in the NR system.

Optionally, in another possible implementation of this application, if the first waveform supports spectrum shaping (SS), the terminal device further sends first power difference information corresponding to the first waveform to the network device, where a first power difference corresponding to the first waveform is a difference between a maximum transmit power of the terminal device when the first waveform is modulated by using a first modulation scheme to which SS is added and a maximum transmit power of the terminal device when the first waveform is modulated by using a second modulation scheme; or the terminal device further sends an additional power corresponding to the first waveform to the network device, where the additional power corresponding to the first waveform is a difference between a maximum transmit power of the terminal device when the first waveform is modulated by using a first modulation scheme to which SS is added and a maximum transmit power of the terminal device when the first waveform is modulated by using a first modulation scheme to which SS is not added; or if the second waveform supports spectrum shaping (SS), the terminal device further sends first power difference information corresponding to the second waveform to the network device, where a first power difference corresponding to the second waveform is a difference between a maximum transmit power of the terminal device when the second waveform is modulated by using a first modulation scheme to which SS is added and a maximum transmit power of the terminal device when the second waveform is modulated by using a second modulation scheme; or the terminal device further sends an additional power corresponding to the second waveform to the network device, where the additional power corresponding to the second waveform is a difference between a maximum transmit power of the terminal device when the second waveform is modulated by using a first modulation scheme to which SS is added and a maximum transmit power of the terminal device when the second waveform is modulated by using a first modulation scheme to which SS is not added.

According to a second aspect, a terminal device is provided. The terminal device supports use of a first waveform and a second waveform for data transmission, a type of the first waveform is different from that of the second waveform, and the terminal device includes a processing unit and a sending unit.

Functions implemented by the unit modules provided in this application are specifically as follows.

The processing unit is configured to determine first power headroom information and, where the first power headroom information is used to indicate power headroom of the terminal device when data is transmitted by using the first waveform, $\Delta_M$ is a difference between a first maximum power and a second maximum power, the first maximum power is a maximum power of the terminal device when data is transmitted by using the first waveform, and the second maximum power is a maximum power of the terminal device when data is transmitted by using the second waveform; and the sending unit is configured to send, to a network device, the first power headroom information and $\Delta_M$ that are determined by the processing unit.

Optionally, in a possible implementation of this application, $\Delta_M$ is pre-configured, or is calculated by the terminal device based on the first maximum power and the second maximum power. If $\Delta_M$ is calculated by the terminal device based on the first maximum power and the second maximum power, the sending unit is further configured to send $\Delta_M$ to the network device.

Optionally, in another possible implementation of this application, when an uplink channel of the terminal device is transmitted without using the first waveform, the processing unit is specifically configured to: if the uplink channel of the terminal device is transmitted by using the second waveform, calculate the first power headroom information based on a scheduling parameter in case of the uplink channel of the terminal device is transmitted by using the second waveform.

Optionally, in another possible implementation of this application, if the first waveform supports spectrum shaping (SS), the sending unit is further configured to: send first power difference information corresponding to the first waveform to the network device, where a first power difference corresponding to the first waveform is a difference between a maximum transmit power of the terminal device when the first waveform is modulated by using a first modulation scheme to which SS is added and a maximum transmit power of the terminal device when the first waveform is modulated by using a second modulation scheme; or send an additional power corresponding to the first waveform to the network device, where the additional power corresponding to the first waveform is a difference between a maximum transmit power of the terminal device when the first waveform is modulated by using a first modulation scheme to which SS is added and a maximum transmit power of the terminal device when the first waveform is modulated by using a first modulation scheme to which SS is not added; or if the second waveform supports spectrum shaping (SS), the sending unit is further configured to: send first power difference information corresponding to the second waveform to the network device, where a first power difference corresponding to the second waveform is a difference between a maximum transmit power of the terminal device when the second waveform is modulated by using a first modulation scheme to which SS is added and a maximum transmit power of the terminal device when the second waveform is modulated by using a second modulation scheme; or send an additional power corresponding to the second waveform to the network device, where the additional power corresponding to the second waveform is a difference between a maximum transmit power of the terminal device when the second waveform is modulated by using a first modulation scheme to which SS is added and a maximum transmit power of the terminal device when the second waveform is modulated by using a first modulation scheme to which SS is not added.

Under action of SS, a maximum power of the terminal device additionally increases. When a waveform supports SS, the terminal device further sends first power difference information corresponding to the waveform or an additional power corresponding to the waveform to the network device, so that the network device can schedule a resource for the terminal device more accurately and sufficiently.

For specific descriptions of the second aspect and various implementations of the second aspect in this application, refer to detailed descriptions of the first aspect and various implementations of the first aspect. In addition, for beneficial effects of the second aspect and various implementations of the second aspect, refer to analysis of the beneficial effects of the first aspect and various implementations of the first aspect. Details are not described herein again.

According to a third aspect, a power headroom transmission method is provided, and is applied to a terminal device that supports use of a first waveform and a second waveform for data transmission, where a type of the first waveform is different from that of the second waveform. The transmission method includes: after determining first power headroom information and second power headroom information, sending, by the terminal device, the first power headroom information and the second power headroom information to a network device, where the first power headroom information is used to indicate power headroom of the terminal device when data is transmitted by using the first waveform, and the second power headroom information is used to indicate power headroom of the terminal device when data is transmitted by using the second signal.

The terminal device in this embodiment may directly send the first power headroom information and the second power headroom information to the network device. In this way, the network device can directly utilize the first power headroom information and the second power headroom information that are received by the network device, to implement resource scheduling for the terminal device.

Optionally, in a possible implementation of this application, a method for sending, by the terminal device, the first power headroom information and the second power headroom information to the network device is: sending, by the terminal device, both the first power headroom information and the second power headroom information to the network device, where the first power headroom information is a value of first power headroom, the second power headroom information is a value of second power headroom or is a power headroom difference, and the power headroom difference is a difference between the second power headroom and the first power headroom.

In a scenario in which the terminal device sends both the first power headroom information and the second power headroom information to the network device, the second power headroom information may be the value of the second power headroom or may be the power headroom difference. A quantity of bits occupied by the power headroom difference is less than a quantity of bits occupied by the value of the second power headroom, and therefore overheads of signaling between the terminal device and the network device can be reduced.

Optionally, in another possible implementation of this application, a method for sending, by the terminal device, the first power headroom information and the second power headroom information to the network device is: when a first preset report condition is satisfied, sending, by the terminal device, target power headroom information to the network device, where the first preset report condition is that reporting of the target power headroom information is triggered when a first timer exceeds first preset duration, and the target power headroom information is the first power headroom information or the second power headroom information; and when a second preset report condition is satisfied, sending, by the terminal device, the first power headroom information and the second power headroom information to the network device, where the second preset report condition is that reporting of the first power headroom information and the second power headroom information is triggered when a second timer exceeds second preset duration, and the second timer coexists with the first timer; or when a third preset report condition is satisfied, sending, by the terminal device, target power headroom information to the network device, where the third preset report condition is that reporting of the target power headroom information is triggered when a change amount of a path loss relative to a path loss corresponding to previous reporting of power headroom information is greater than or equal to a first preset threshold, and the target power headroom information is the first power headroom information or the second power headroom information; and when a fourth preset report condition is satisfied, sending, by the terminal device, the first power headroom information and the second power headroom information to the network device, where the fourth preset report condition is that reporting of the first power headroom information and the second power headroom information is triggered when the change amount of the path loss relative to the path loss corresponding to the previous reporting of power headroom information is greater than or equal to a second preset threshold; or when a fifth preset report condition is satisfied, sending, by the terminal device, target power headroom information to the network device, where the fifth preset report condition is that reporting of the target power headroom information is triggered when a quantity of to-be-stuffed bits of a transmission resource is greater than or equal to a third preset threshold, and the target power headroom information is the first power headroom information or the second power headroom information; and when a sixth preset report condition is satisfied, sending, by the terminal device, the first power headroom information and the second power headroom information to the network device, where the sixth preset report condition is that reporting of the first power headroom information and the second power headroom information is triggered when the quantity of the to-be-stuffed bits of the transmission resource is greater than or equal to a fourth preset threshold.

Optionally, in another possible implementation of this application, a method for sending, by the terminal device, the first power headroom information and the second power headroom information to the network device is: receiving configuration information sent by the network device, where the configuration information is used to instruct to report the first power headroom information and the second power headroom information within a preset time period; and sending, by the terminal device, the first power headroom information and the second power headroom information to the network device within the preset time period based on the configuration information.

The terminal device may send at least one of the first power headroom information or the second power headroom information to the network device under different conditions.

Optionally, in another possible implementation of this application, when an uplink channel of the terminal device is transmitted without using the first waveform, if the uplink channel of the terminal device is transmitted by using the second waveform, the terminal device calculates the first power headroom information based on a scheduling parameter in case of the uplink channel of the terminal device is transmitted by using the second waveform.

Herein, the uplink channel of the terminal device is the same as the uplink channel of the terminal device in the first aspect.

Optionally, in another possible implementation of this application, if the first waveform supports spectrum shaping (SS), the terminal device further sends first power difference information corresponding to the first waveform to the network device, where a first power difference corresponding to the first waveform is a difference between a maximum transmit power of the terminal device when the first waveform is modulated by using a first modulation scheme to which SS is added and a maximum transmit power of the terminal device when the first waveform is modulated by using a second modulation scheme; or the terminal device further sends an additional power corresponding to the first waveform to the network device, where the additional power corresponding to the first waveform is a difference between a maximum transmit power of the terminal device when the first waveform is modulated by using a first modulation scheme to which SS is added and a maximum transmit power of the terminal device when the first waveform is modulated by using a first modulation scheme to which SS is not added; or if the second waveform supports spectrum shaping (SS), the terminal device further sends first power difference information corresponding to the second waveform to the network device, where a first power difference corresponding to the second waveform is a difference between a maximum transmit power of the terminal device when the second waveform is modulated by using a first modulation scheme to which SS is added and a maximum transmit power of the terminal device when the second waveform is modulated by using a second modulation scheme; or the terminal device further sends an additional power corresponding to the second waveform to the network device, where the additional power corresponding to the second waveform is a difference between a maximum transmit power of the terminal device when the second waveform is modulated by using a first modulation scheme to which SS is added and a maximum transmit power of the terminal device when the second waveform is modulated by using a first modulation scheme to which SS is not added.

Under action of SS, a maximum power of the terminal device additionally increases. When a waveform supports SS, the terminal device further sends first power difference information corresponding to the waveform or an additional power corresponding to the waveform to the network device, so that the network device can schedule a resource for the terminal device more accurately and sufficiently.

According to a fourth aspect, a terminal device is provided. The terminal device supports use of a first waveform and a second waveform for data transmission, a type of the first waveform is different from that of the second waveform, and the terminal device includes a processing unit and a sending unit.

Functions implemented by the unit modules provided in this application are specifically as follows.

The processing unit is configured to determine first power headroom information and second power headroom information, where the first power headroom information is used to indicate power headroom of the terminal device when data is transmitted by using the first waveform, and the second power headroom information is used to indicate power headroom of the terminal device when data is transmitted by using the second signal; and the sending unit is configured to send, to a network device, the first power headroom information and the second power headroom information that are determined by the processing unit.

Optionally, in a possible implementation of this application, the sending unit is specifically configured to: send both the first power headroom information and the second power headroom information to the network device, where the first power headroom information is a value of first power headroom, the second power headroom information is a value of second power headroom or is a power headroom difference, and the power headroom difference is a difference between the second power headroom and the first power headroom; or when a first preset report condition is satisfied, send target power headroom information to the network device, where the first preset report condition is that reporting of the target power headroom information is triggered when a first timer exceeds first preset duration, and the target power headroom information is the first power headroom information or the second power headroom information; and when a second preset report condition is satisfied, send the first power headroom information and the second power headroom information to the network device, where the second preset report condition is that reporting of the first power headroom information and the second power headroom information is triggered when a second timer exceeds second preset duration, and the second timer coexists with the first timer; or when a third preset report condition is satisfied, send target power headroom information to the network device, where the third preset report condition is that reporting of the target power headroom information is triggered when a change amount of a path loss relative to a path loss corresponding to previous reporting of power headroom information is greater than or equal to a first preset threshold, and the target power headroom information is the first power headroom information or the second power headroom information; and when a fourth preset report condition is satisfied, send the first power headroom information and the second power headroom information to the network device, where the fourth preset report condition is that reporting of the first power headroom information and the second power headroom information is triggered when the change amount of the path loss relative to the path loss corresponding to the previous reporting of power headroom information is greater than or equal to a second preset threshold; or when a fifth preset report condition is satisfied, send target power headroom information to the network device, where the fifth preset report condition is that reporting of the target power headroom information is triggered when a quantity of to-be-stuffed bits of a transmission resource is greater than or equal to a third preset threshold, and the target power headroom information is the first power headroom information or the second power headroom information; and when a sixth preset report condition is satisfied, send the first power headroom information and the second power headroom information to the network device, where the sixth preset report condition is that reporting of the first power headroom information and the second power headroom information is triggered when the quantity of the to-be-stuffed bits of the transmission resource is greater than or equal to a fourth preset threshold.

Optionally, in another possible implementation of this application, the terminal device provided in this embodiment of this application further includes a receiving unit. The receiving unit is configured to receive configuration information sent by the network device, where the configuration information is used to instruct to report the first power headroom information and the second power headroom information within a preset time period. Correspondingly, the sending unit is specifically configured to send the first power headroom information and the second power headroom information to the network device within the preset time period based on the configuration information received by the receiving unit.

Optionally, in another possible implementation of this application, when an uplink channel of the terminal device is transmitted without using the first waveform, the processing unit is specifically configured to: if the uplink channel of the terminal device is transmitted by using the second waveform, calculate the first power headroom information based on a scheduling parameter in case of the uplink channel of the terminal device is transmitted by using the second waveform.

Optionally, in another possible implementation of this application, if the first waveform supports spectrum shaping (SS), the sending unit is further configured to: send first power difference information corresponding to the first waveform to the network device, where a first power difference corresponding to the first waveform is a difference between a maximum transmit power of the terminal device when the first waveform is modulated by using a first modulation scheme to which SS is added and a maximum transmit power of the terminal device when the first waveform is modulated by using a second modulation scheme; or send an additional power corresponding to the first waveform to the network device, where the additional power corresponding to the first waveform is a difference between a maximum transmit power of the terminal device when the first waveform is modulated by using a first modulation scheme to which SS is added and a maximum transmit power of the terminal device when the first waveform is modulated by using a first modulation scheme to which SS is not added; or if the second waveform supports spectrum shaping (SS), the sending unit is further configured to: send first power difference information corresponding to the second waveform to the network device, where a first power difference corresponding to the second waveform is a difference between a maximum transmit power of the terminal device when the second waveform is modulated by using a first modulation scheme to which SS is added and a maximum transmit power of the terminal device when the second waveform is modulated by using a second modulation scheme; or send an additional power corresponding to the second waveform to the network device, where the additional power corresponding to the second waveform is a difference between a maximum transmit power of the terminal device when the second waveform is modulated by using a first modulation scheme to which SS is added and a maximum transmit power of the terminal device when the second waveform is modulated by using a first modulation scheme to which SS is not added.

For specific descriptions of the fourth aspect and various implementations of the fourth aspect in this application, refer to detailed descriptions of the third aspect and various implementations of the third aspect. In addition, for beneficial effects of the fourth aspect and various implementations of the fourth aspect, refer to analysis of the beneficial effects of the third aspect and various implementations of the third aspect. Details are not described herein again.

According to a fifth aspect, a terminal device is provided. The terminal device includes a processor, a memory, and a communications interface. The memory is configured to store computer program code, where the computer program code includes an instruction, and the processor, the communications interface, and the memory are connected through a bus. When the terminal device runs, the processor executes the instruction stored in the memory, so that the terminal device performs the power headroom transmission method according to the first aspect and various possible implementations of the first aspect, or performs the power headroom transmission method according to the third aspect and various possible implementations of the third aspect.

According to a sixth aspect, a computer readable storage medium is further provided, where the computer readable storage medium stores an instruction. When the instruction is run on a terminal device, the terminal device is enabled to perform the power headroom transmission method according to the first aspect and various possible implementations of the first aspect, or perform the power headroom transmission method according to the third aspect and various possible implementations of the third aspect.

According to a seventh aspect, a computer program product including an instruction is further provided. When the computer program product is run on a terminal device, the terminal device is enabled to perform the power headroom transmission method according to the first aspect and various possible implementations of the first aspect, or perform the power headroom transmission method according to the third aspect and various possible implementations of the third aspect.

In this application, a name of the foregoing terminal device does not constitute any limitation on a device or a functional module. In actual implementation, these devices or functional modules may have other names. Each device or functional module falls within the scope defined by the claims and their equivalent technologies in this application, provided that a function of the device or functional module is similar to that described in this application.

For specific descriptions of the fifth aspect, the sixth aspect, the seventh aspect, and various implementations of the fifth aspect, the sixth aspect, and the seventh aspect in this application, refer to detailed descriptions of the first aspect and various implementations of the first aspect, or refer to detailed descriptions of the third aspect and various implementations of the third aspect. In addition, for beneficial effects of the fifth aspect, the sixth aspect, the seventh aspect, and various implementations of the fifth aspect, the sixth aspect, and the seventh aspect, refer to analysis of the beneficial effects of the first aspect and various implementations of the first aspect, or refer to analysis of the beneficial effects of the third aspect and various implementations of the third aspect. Details are not described herein again.

According to an eighth aspect, a power headroom transmission method is provided. The transmission method includes: obtaining, by a network device, first power headroom information, $\Delta_M$, and a second power difference, where the first power headroom information is used to indicate power headroom of a terminal device when data is transmitted by using a first waveform, $\Delta_M$ is equal to a difference between a first maximum power and a second maximum power, the first maximum power is a maximum power of the terminal device when data is transmitted by using the first waveform, the second maximum power is a maximum power of the terminal device when data is transmitted by using a second waveform, a type of the first waveform is different from that of the second waveform, the second power difference is a difference between a first configuration transmit power and a second configuration transmit power, the first configuration transmit power is a power configured by the network device for the terminal device when a physical uplink shared channel (PUSCH) is transmitted by using the first waveform, and the second configuration transmit power is a power configured by the network device for the terminal device when the PUSCH is transmitted by using the second waveform; calculating, by the network device, second power headroom information based on the first power headroom information, $\Delta_M$, and the second power difference, where the second power headroom information is used to indicate power headroom of the terminal device when data is transmitted by using the second waveform; and performing, by the network device, scheduling on the terminal device based on the first power headroom information and the second power headroom information.

In the case of the first power headroom information, $\Delta_M$, and the second power difference are obtained, the network device can calculate the second power headroom information. In this way, the network device can implement resource scheduling for the terminal device based on the first power headroom information and the second power headroom information.

Optionally, in a possible implementation of this application, a method for obtaining, by the network device, the first power headroom information is: receiving, by the network device, the first power headroom information sent by the terminal device. A method for obtaining, by the network device, $\Delta_M$ is: receiving, by the network device, $\Delta_M$ sent by the terminal device, or obtaining preset $\Delta_M$.

Optionally, in another possible implementation of this application, if the first waveform supports spectrum shaping (SS), the network device further receives first power difference information that is corresponding to the first waveform and that is sent by the terminal device, where a first power difference corresponding to the first waveform is a difference between a maximum transmit power of the terminal device when the first waveform is modulated by using a first modulation scheme to which SS is added and a maximum transmit power of the terminal device when the first waveform is modulated by using a second modulation scheme; or the network device further receives an additional power that is corresponding to the first waveform and that is sent by the terminal device, where the additional power corresponding to the first waveform is a difference between a maximum transmit power of the terminal device when the first waveform is modulated by using a first modulation scheme to which SS is added and a maximum transmit power of the terminal device when the first waveform is modulated by using a first modulation scheme to which SS is not added. If the second waveform supports spectrum shaping (SS), the network device further receives first power difference information that is corresponding to the second waveform and that is sent by the terminal device, where a first power difference corresponding to the second waveform is a difference between a maximum transmit power of the terminal device when the second waveform is modulated by using a first modulation scheme to which SS is added and a maximum transmit power of the terminal device when the second waveform is modulated by using a second modulation scheme; or the network device further receives an additional power that is corresponding to the second waveform and that is sent by the terminal device, where the additional power corresponding to the second waveform is a difference between a maximum transmit power of the terminal device when the second waveform is modulated by using a first modulation scheme to which SS is added and a maximum transmit power of the terminal device when the second waveform is modulated by using a first modulation scheme to which SS is not added. Correspondingly, if the first waveform supports SS, a method for performing, by the network device, scheduling on the terminal device based on the first power headroom information and the second power headroom information is: performing, by the network device, scheduling on the terminal device based on the first power headroom information, the second power headroom information, and the first power difference information corresponding to the first waveform; or performing, by the network device, scheduling on the terminal device based on the first power headroom information, the second power headroom information, and the additional power corresponding to the first waveform. If the second waveform supports SS, a method for performing, by the network device, scheduling on the terminal device based on the first power headroom information and the second power headroom information is: performing, by the network device, scheduling on the terminal device based on the first power headroom information, the second power headroom information, and the first power difference information corresponding to the second waveform; or performing, by the network device, scheduling on the terminal device based on the first power headroom information, the second power headroom information, and the additional power corresponding to the second waveform.

Under action of SS, a maximum power of the terminal device additionally increases. When a waveform supports SS, the network device may further receive a first power difference that is corresponding to the waveform and that is reported by the terminal device or an additional power that is corresponding to the waveform and that is reported by the terminal device. In this way, the network device can schedule a resource for the terminal device more accurately and sufficiently.

According to a ninth aspect, a network device is provided. The network device includes an obtaining unit and a processing unit.

Functions implemented by the unit modules provided in this application are specifically as follows.

The obtaining unit is configured to obtain first power headroom information, $\Delta_M$, and a second power difference, where the first power headroom information is used to indicate power headroom of a terminal device when data is transmitted by using a first waveform, $\Delta_M$ is equal to a difference between a first maximum power and a second maximum power, the first maximum power is a maximum power of the terminal device when data is transmitted by using the first waveform, the second maximum power is a maximum power of the terminal device when data is transmitted by using a second waveform, a type of the first waveform is different from that of the second waveform, the second power difference is a difference between a first configuration transmit power and a second configuration transmit power, the first configuration transmit power is a power configured by the network device for the terminal device when a physical uplink shared channel (PUSCH) is transmitted by using the first waveform, and the second configuration transmit power is a power configured by the network device for the terminal device when the PUSCH is transmitted by using the second waveform; and the processing unit is configured to: calculate second power headroom information based on the first power headroom information, $\Delta_M$, and the second power difference that are obtained by the obtaining unit, where the second power headroom information is used to indicate power headroom of the terminal device when data is transmitted by using the second waveform; and perform scheduling on the terminal device based on the first power headroom information and the second power headroom information.

Optionally, in a possible implementation of this application, the obtaining unit is specifically configured to receive the first power headroom information sent by the terminal device; and the obtaining unit is specifically configured to: receive $\Delta_M$ sent by the terminal device, or obtain preset $\Delta_M$.

Optionally, in a possible implementation of this application, if the first waveform supports spectrum shaping (SS), the obtaining unit is further configured to: receive first power difference information that is corresponding to the first waveform and that is sent by the terminal device, where a first power difference corresponding to the first waveform is a difference between a maximum transmit power of the terminal device when the first waveform is modulated by using a first modulation scheme to which SS is added and a maximum transmit power of the terminal device when the first waveform is modulated by using a second modulation scheme; or receive an additional power that is corresponding to the first waveform and that is sent by the terminal device, where the additional power corresponding to the first waveform is a difference between a maximum transmit power of the terminal device when the first waveform is modulated by using a first modulation scheme to which SS is added and a maximum transmit power of the terminal device when the first waveform is modulated by using a first modulation scheme to which SS is not added; and correspondingly, if the first waveform supports SS, the processing unit is specifically configured to: perform scheduling on the terminal device based on the first power headroom information, the second power headroom information, and the first power difference information corresponding to the first waveform; or perform scheduling on the terminal device based on the first power headroom information, the second power headroom information, and the additional power corresponding to the first waveform; or if the second waveform supports spectrum shaping (SS), the obtaining unit is further configured to: receive first power difference information that is corresponding to the second waveform and that is sent by the terminal device, where a first power difference corresponding to the second waveform is a difference between a maximum transmit power of the terminal device when the second waveform is modulated by using a first modulation scheme to which SS is added and a maximum transmit power of the terminal device when the second waveform is modulated by using a second modulation scheme; or receive an additional power that is corresponding to the second waveform and that is sent by the terminal device, where the additional power corresponding to the second waveform is a difference between a maximum transmit power of the terminal device when the second waveform is modulated by using a first modulation scheme to which SS is added and a maximum transmit power of the terminal device when the second waveform is modulated by using a first modulation scheme to which SS is not added; and correspondingly, the processing unit is specifically configured to: perform scheduling on the terminal device based on the first power headroom information, the second power headroom information, and the first power difference information corresponding to the second waveform; or perform scheduling on the terminal device based on the first power headroom information, the second power headroom information, and the additional power corresponding to the second waveform.

For specific descriptions of the ninth aspect and various implementations of the ninth aspect in this application, refer to detailed descriptions of the eighth aspect and various implementations of the eighth aspect. In addition, for beneficial effects of the ninth aspect and various implementations of the ninth aspect, refer to analysis of the beneficial effects of the eighth aspect and various implementations of the eighth aspect. Details are not described herein again.

According to a tenth aspect, a power headroom transmission method is provided. The transmission method is: receiving, by a network device, first power headroom information and second power headroom information that are sent by a terminal device, where the first power headroom information is used to indicate power headroom of the terminal device when data is transmitted by using a first waveform, and the second power headroom information is used to indicate power headroom of the terminal device when data is transmitted by using a second waveform; and performing, by the network device, scheduling on the terminal device based on the first power headroom information and the second power headroom information.

It can be learned that the network device in this embodiment may directly obtain the first power headroom information and the second power headroom information. In this way, the network device can implement resource scheduling for the terminal device directly based on the first power headroom information and the second power headroom information.

Optionally, in a possible implementation of this application, before the network device receives the first power headroom information and the second power headroom information that are sent by the terminal device, the network device further determines configuration information that is used to instruct the terminal device to report the first power headroom information and the second power headroom information within a preset time period, and sends the configuration information to the terminal device. In this way, a method for receiving, by the network device, the first power headroom information and the second power headroom information that are sent by the terminal device is specifically: receiving, within the preset time period, the first power headroom information and the second power headroom information that are sent by the terminal device.

Optionally, in another possible implementation of this application, if the first waveform supports spectrum shaping (SS), the network device further receives first power difference information that is corresponding to the first waveform and that is sent by the terminal device, where a first power difference corresponding to the first waveform is a difference between a maximum transmit power of the terminal device when the first waveform is modulated by using a first modulation scheme to which SS is added and a maximum transmit power of the terminal device when the first waveform is modulated by using a second modulation scheme; or the network device further receives an additional power that is corresponding to the first waveform and that is sent by the terminal device, where the additional power corresponding to the first waveform is a difference between a maximum transmit power of the terminal device when the first waveform is modulated by using a first modulation scheme to which SS is added and a maximum transmit power of the terminal device when the first waveform is modulated by using a first modulation scheme to which SS is not added; and correspondingly, if the first waveform supports SS, a method for performing, by the network device, scheduling on the terminal device based on the first power headroom information and the second power headroom information is: performing, by the network device, scheduling on the terminal device based on the first power headroom information, the second power headroom information, and the first power difference information corresponding to the first waveform; or performing, by the network device, scheduling on the terminal device based on the first power headroom information, the second power headroom information, and the additional power corresponding to the first waveform; or if the second waveform supports spectrum shaping (SS), the network device further receives first power difference information that is corresponding to the second waveform and that is sent by the terminal device, where a first power difference corresponding to the second waveform is a difference between a maximum transmit power of the terminal device when the second waveform is modulated by using a first modulation scheme to which SS is added and a maximum transmit power of the terminal device when the second waveform is modulated by using a second modulation scheme; or the network device further receives an additional power that is corresponding to the second waveform and that is sent by the terminal device, where the additional power corresponding to the second waveform is a difference between a maximum transmit power of the terminal device when the second waveform is modulated by using a first modulation scheme to which SS is added and a maximum transmit power of the terminal device when the second waveform is modulated by using a first modulation scheme to which SS is not added; and correspondingly, if the second waveform supports SS, a method for performing, by the network device, scheduling on the terminal device based on the first power headroom information and the second power headroom information is: performing, by the network device, scheduling on the terminal device based on the first power headroom information, the second power headroom information, and the first power difference information corresponding to the second waveform; or performing, by the network device, scheduling on the terminal device based on the first power headroom information, the second power headroom information, and the additional power corresponding to the second waveform.

Under action of SS, a maximum power of the terminal device additionally increases. When a waveform supports SS, the network device may further receive a first power difference that is corresponding to the waveform and that is reported by the terminal device or an additional power that is corresponding to the waveform and that is reported by the terminal device. In this way, the network device can schedule a resource for the terminal device more accurately and sufficiently.

According to an eleventh aspect, a network device is provided. The network device includes a receiving unit and a processing unit.

Functions implemented by the unit modules provided in this application are specifically as follows.

The receiving unit is configured to receive first power headroom information and second power headroom information that are sent by a terminal device, where the first power headroom information is used to indicate power headroom of the terminal device when data is transmitted by using a first waveform, and the second power headroom information is used to indicate power headroom of the terminal device when data is transmitted by using a second waveform; and the processing unit is configured to perform scheduling on the terminal device based on the first power headroom information and the second power headroom information that are received by the receiving unit.

Optionally, in a possible implementation of this application, the processing unit is further configured to: before the receiving unit receives the first power headroom information and the second power headroom information that are sent by the terminal device, determine configuration information, where the configuration information is used to instruct the terminal device to report the first power headroom information and the second power headroom information within a preset time period; and the receiving unit is specifically configured to receive, within the preset time period, the first power headroom information and the second power headroom information that are sent by the terminal device.

Optionally, in another possible implementation of this application, if the first waveform supports spectrum shaping (SS), the receiving unit is further configured to: receive first power difference information that is corresponding to the first waveform and that is sent by the terminal device, where a first power difference corresponding to the first waveform is a difference between a maximum transmit power of the terminal device when the first waveform is modulated by using a first modulation scheme to which SS is added and a maximum transmit power of the terminal device when the first waveform is modulated by using a second modulation scheme; or receive an additional power that is corresponding to the first waveform and that is sent by the terminal device, where the additional power corresponding to the first waveform is a difference between a maximum transmit power of the terminal device when the first waveform is modulated by using a first modulation scheme to which SS is added and a maximum transmit power of the terminal device when the first waveform is modulated by using a first modulation scheme to which SS is not added; and correspondingly, if the first waveform supports SS, the processing unit is specifically configured to: perform scheduling on the terminal device based on the first power headroom information, the second power headroom information, and the first power difference information corresponding to the first waveform; or perform scheduling on the terminal device based on the first power headroom information, the second power headroom information, and the additional power corresponding to the first waveform; or if the second waveform supports spectrum shaping (SS), the receiving unit is further configured to: receive first power difference information that is corresponding to the second waveform and that is sent by the terminal device, where a first power difference corresponding to the second waveform is a difference between a maximum transmit power of the terminal device when the second waveform is modulated by using a first modulation scheme to which SS is added and a maximum transmit power of the terminal device when the second waveform is modulated by using a second modulation scheme; or receive an additional power that is corresponding to the second waveform and that is sent by the terminal device, where the additional power corresponding to the second waveform is a difference between a maximum transmit power of the terminal device when the second waveform is modulated by using a first modulation scheme to which SS is added and a maximum transmit power of the terminal device when the second waveform is modulated by using a first modulation scheme to which SS is not added; and correspondingly, if the second waveform supports SS, the processing unit is specifically configured to: perform scheduling on the terminal device based on the first power headroom information, the second power headroom information, and the first power difference information corresponding to the second waveform; or perform scheduling on the terminal device based on the first power headroom information, the second power headroom information, and the additional power corresponding to the second waveform.

According to a twelfth aspect, a network device is provided. The network device includes a processor, a memory, and a communications interface. The memory is configured to store computer program code, where the computer program code includes an instruction, and the processor, the communications interface, and the memory are connected through a bus. When the network device runs, the processor executes the instruction stored in the memory, so that the network device performs the power headroom transmission method according to the eighth aspect and various possible implementations of the eighth aspect, or performs the power headroom transmission method according to the tenth aspect and various possible implementations of the tenth aspect.

According to a thirteenth aspect, a computer readable storage medium is further provided, where the computer readable storage medium stores an instruction. When the instruction is run on a network device, the network device is enabled to perform the power headroom transmission method according to the eighth aspect and various possible implementations of the eighth aspect, or perform the power headroom transmission method according to the tenth aspect and various possible implementations of the tenth aspect.

According to a fourteenth aspect, a computer program product including an instruction is further provided. When the computer program product is run on a network device, the network device is enabled to perform the power headroom transmission method according to the eighth aspect and various possible implementations of the eighth aspect, or perform the power headroom transmission method according to the tenth aspect and various possible implementations of the tenth aspect.

In this application, a name of the foregoing network device does not constitute any limitation on a device or a functional module. In actual implementation, these devices or functional modules may have other names. Each device or functional module falls within the scope defined by the claims and their equivalent technologies in this application, provided that a function of the device or functional module is similar to that described in this application.

For specific descriptions of the twelfth aspect, the thirteenth aspect, the fourteenth aspect, and various implementations of the twelfth aspect, the thirteenth aspect, and the fourteenth aspect in this application, refer to detailed descriptions of the eighth aspect and various implementations of the eighth aspect, or refer to detailed descriptions of the tenth aspect and various implementations of the tenth aspect. In addition, for beneficial effects of the twelfth aspect, the thirteenth aspect, the fourteenth aspect, and various implementations of the twelfth aspect, the thirteenth aspect, and the fourteenth aspect, refer to analysis of the beneficial effects of the eighth aspect and various implementations of the eighth aspect, or refer to analysis of the beneficial effects of the tenth aspect and various implementations of the tenth aspect. Details are not described herein again.

These aspects or another aspect in this application are more concise and comprehensible in the following description.

DETAILED DESCRIPTION OF ILLUSTRATIVE EMBODIMENTS

Figure 1:
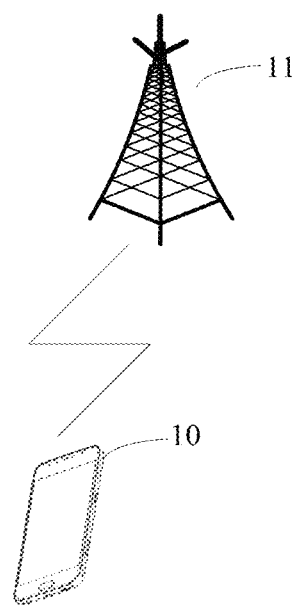
FIG. 1 is a structural diagram of a communications system according to an embodiment of this application.

In the specification, claims, and accompanying drawings of this application, the terms such as "first", "second", "third", and "fourth" are intended to distinguish between different objects but do not indicate a particular order.

In the embodiments of this application, the word "for example" or the like is used to represent giving an example, an illustration, or a description. Any embodiment or design scheme described as "for example" in the embodiments of this application should not be interpreted as being preferable or having more advantages than another embodiment or design scheme. Exactly, use of the word "for example" or the like is intended to present a related concept in a specific manner.

For ease of understanding of the embodiments of this application, a related element in the embodiments of this application is first described herein.

PH is a difference between a maximum transmit power (represented by $P_{MAX}$) of a terminal device and a calculated configuration transmit power (represented by $P_{C\text{-}Data}$) of the terminal device. The configuration transmit power of the terminal device is a power configured by a network device for the terminal device when an uplink channel of the terminal device is being transmitted. The uplink channel of the terminal device may be a PUSCH, a PUCCH, an NR-PUSCH, or an NR-PUCCH.

It can be understood that, when the uplink channel of the terminal device is any one of a PUSCH, a PUCCH, an NR-PUSCH, and an NR-PUCCH, a power headroom transmission method provided in the embodiments of this application can be performed.

For ease of description, an example in which the uplink channel of the terminal device is a PUSCH is used for description in the embodiments of this application.

For example, when the uplink channel of the terminal device is a PUSCH, a calculation formula of PH may be represented by a formula (1):

$$PH = P_{MAX} - P_{C\text{-}Data} \quad (1)$$

where a calculation formula of $P_{C\text{-}Data}$ may be represented by a formula (2):

$$P_{C\text{-}Data} = 10\log_{10}M + P_0 + \alpha \cdot PL + \Delta_{TF} + f \quad (2).$$

In the formula (2), M is a quantity of resource blocks (RB) occupied by a current PUSCH, that is, a quantity of resource blocks scheduled for the PUSCH, $P_o$ is an open-loop power control adjustment value, α is a partial path loss compensation value, PL is a path loss value calculated by the terminal device, $\Delta_{TF}$ is a transport format compensation value, and f is a closed-loop power control adjustment value.

It can be learned from the formula (2) that the calculated configuration transmit power of the terminal device is related to all of bandwidth of a resource occupied by a current PUSCH, a path loss between the terminal device and a base station, an open-loop power control configuration, and a closed-loop power control configuration.

After PH information reporting is triggered, when the terminal device has an uplink scheduling resource that can accommodate PH information, the terminal device sends PH information of the terminal device to the network device, so that the network device performs resource scheduling and power control for the terminal device. Generally, the terminal device reports the PH information of the terminal device to the network device by using a media access control (MAC) layer control element (CE). Specifically, the terminal device generates a PH MAC CE and reports the PH MAC CE to the network device. If the PH information reported by the terminal device reflects that the terminal device has a relatively large amount of power headroom, the network device can allocate a relatively large quantity of radio resource blocks to the terminal device. If the PH information reported by the terminal device reflects that the terminal device already has no power headroom or does not have much power headroom, the network device can allocate a relatively small quantity of radio resource blocks or a lower-order modulation command to the terminal device.

The 3GPP NR standard stipulates that both an OFDM waveform and a DFT-S-OFDM waveform are used in an uplink for data transmission. In this case, the network device needs to obtain PH information of the terminal device when data is transmitted by using the OFDM waveform and obtain PH information of the terminal device when data is transmitted by using the DFT-S-OFDM waveform. However, currently there is no method for obtaining the two types of PH information by the network device.

As regards this problem, an embodiment of this application provides a power headroom transmission method. For a terminal device that supports use of a first waveform and a second waveform for data transmission, the terminal device may directly send, to a network device, first power headroom information and second power headroom information that are determined by the terminal device; or the terminal device determines first power headroom information and $\Delta_M$, and sends the first power headroom information and $\Delta_M$ to a network device, so that the network device determines second power headroom information based on the first power headroom information, $\Delta_M$, and other related information. In this way, the network device can perform scheduling on the terminal device based on the first power headroom information and the second power headroom information.

The power headroom transmission method provided in this embodiment of this application is applicable to a communications system. FIG. 1 is a structural diagram of a communications system according to an embodiment of this application. As shown in FIG. 1, the communications system includes a terminal device 10 and a network device 11. In actual application, the communications system usually includes a plurality of terminal devices 10 and a plurality of network devices 11. To simplify the system in discussion, FIG. 1 shows only a single terminal device 10 and a single network device 11.

The terminal device 10 supports use of two different types of waveforms for data transmission. The terminal device 10 may send PH information to the network device 11. The PH information may include information used to indicate a difference between a maximum transmit power of the terminal device and a calculated configuration transmit power of the terminal device. The terminal device 10 may send the PH information periodically, or may send the PH information when a change amount of a downlink path loss exceeds a threshold.

The terminal device 10 may be a device that provides voice and/or data connectivity for a user, a handheld device having a wireless connection function, or another processing device connected to a wireless modem. The terminal device 10 may communicate with one or more core networks through a radio access network (RAN). The terminal device 10 may be a mobile terminal, such as a mobile phone (also referred to as a "cellular" phone), or a computer having a mobile terminal, or may be a portable, pocket-sized, handheld, computer built-in, or in-vehicle mobile apparatus, and such mobile apparatuses exchange language and/or data with the radio access network. For example, the terminal device 10 may be a mobile phone, a tablet computer, a notebook computer, a netbook, or a personal digital assistant (PDA).

Figure 2:
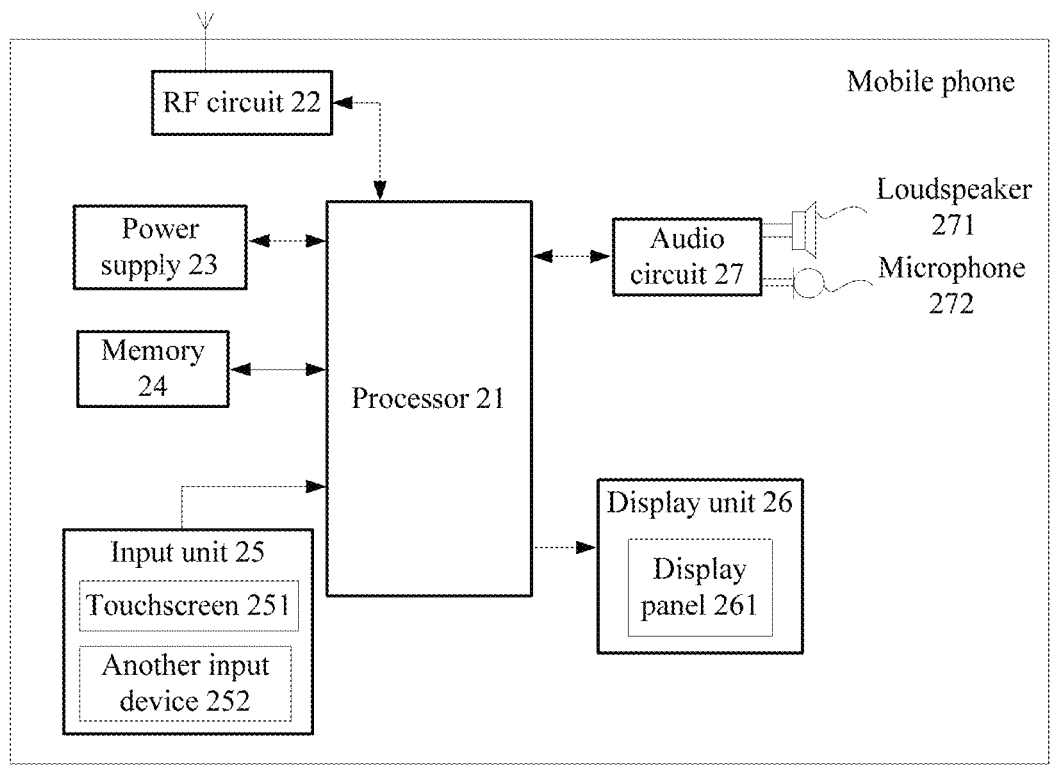
FIG. 2 is a schematic diagram of a hardware structure of a mobile phone according to an embodiment of this application.

For example, in this embodiment of this application, the terminal device 10 shown in FIG. 1 may be a mobile phone. The following describes constituent parts of the mobile phone in this embodiment of this application in detail with reference to FIG. 2. As shown in FIG. 2, the mobile phone includes components such as a processor 21, a radio frequency (RF) circuit 22, a power supply 23, a memory 24, an input unit 25, a display unit 26, and an audio circuit 27. A person skilled in the art can understand that the mobile phone structure shown in FIG. 2 does not constitute any limitation on the mobile phone, and the mobile phone may include components more or fewer than those shown in FIG. 2, or may include a combination of some components shown in FIG. 2, or may include components disposed differently from those shown in FIG. 2.

The processor 21 is a control center of the mobile phone, is connected to all the parts of the entire mobile phone by using various interfaces and lines, and by running or executing a software program and/or a module that are/is stored in the memory 24 and by invoking data stored in the memory 24, performs various functions and data processing of the mobile phone, so as to perform overall monitoring on the mobile phone. Optionally, the processor 21 may include one or more processing units. An application processor and a modem processor may be integrated into the processor 21. The application processor mainly processes an operating system, a user interface, an application program, and the like, and the modem processor mainly processes wireless communication. The foregoing modem processor and the processor 21 may be alternatively independent of each other.

The RF circuit 22 may be configured to receive and send signals in an information receiving/sending process or a call process. In particular, after receiving downlink information from a base station, the RF circuit 22 sends the downlink information to the processor 21 for processing, and sends uplink data to the base station. The RF circuit usually includes but is not limited to an antenna, at least one amplifier, a transceiver, a coupler, a low noise amplifier (LNA), and a duplexer. In addition, the RF circuit 22 may also perform wireless communication with a network and another device. Any communications standard or protocol may be used for the wireless communication, including but not limited to: global system for mobile communications (GSM), general packet radio service (GPRS), code division multiple access (CDMA), wideband code division multiple access (WCDMA), LTE, email, and short message service (SMS).

The mobile phone includes the power supply 23 (for example, a battery) that supplies power to all the components. Optionally, the power supply may be logically connected to the processor 21 by using a power management system, so that functions such as charging and discharging management and power consumption management are implemented by using the power management system.

The memory 24 may be configured to store the software program and the module.

The processor 21 performs various function applications and data processing of the mobile phone by running the software program and the module that are stored in the memory 24. The memory 24 may mainly include a program storage area and a data storage area. The program storage area may store an operating system, an application program required by at least one function (such as a voice playing function and an image playing function), and the like. The data storage area may store data (such as audio data, image data, and a phone book) created based on use of the mobile phone, and the like. In addition, the memory 24 may include a high-speed random access memory, and may further include a nonvolatile memory, for example, at least one magnetic disk storage device, a flash memory device, or another volatile solid-state storage device.

The input unit 25 may be configured to receive input digit or character information, and generate key signal input related to user setting and function control of the mobile phone. Specifically, the input unit 25 may include a touchscreen 251 and another input device 252. The touchscreen 25, also referred to as a touch panel, may collect a touch operation performed by a user on or near the touchscreen 251 (for example, an operation performed by the user on or near the touchscreen 25 by using any proper object or accessory, such as a finger or a stylus), and drive a corresponding connecting apparatus according to a preset program. Optionally, the touchscreen 25 may include two parts: a touch detection apparatus and a touch controller. The touch detection apparatus detects a touch position of the user, detects a signal generated by a touch operation, and transmits the signal to the touch controller. The touch controller receives touch information from the touch detection apparatus, converts the touch information into contact coordinates, and sends the contact coordinates to the processor 21, and is also capable of receiving and executing a command sent by the processor 21. In addition, the touchscreen 251 may be implemented by using a plurality of types, such as a resistive type, a capacitive type, an infrared type, and a surface acoustic wave type. The another input device 252 may include but is not limited to one or more of a physical keyboard and a function key (such as a volume control key or a power on/off key).

The display unit 26 may be configured to display information entered by the user or information provided for the user, and various menus of the mobile phone. The display unit 26 may include a display panel 261. Optionally, the display panel 261 may be configured in a form of a liquid crystal display (LCD), an organic light-emitting diode (OLED), or the like. Further, the touchscreen 25 may cover the display panel 261. After detecting a touch operation on or near the touchscreen 251, the touchscreen 251 transmits information about the touch operation to the processor 21 to determine a touch event type, and then the processor 21 provides corresponding visual output on the display panel 261 based on the touch event type. In FIG. 2, the touchscreen 25 and the display panel 261 are used as two independent components to implement input and output functions of the mobile phone. However, in some embodiments, the touchscreen 25 and the display panel 261 may be integrated to implement the input and output functions of the mobile phone.

The audio circuit 27, a loudspeaker 271, and a microphone 272 are configured to provide an audio interface between the user and the mobile phone. The audio circuit 27 may transmit, to the loudspeaker 271, an electrical signal that is obtained after conversion of received audio data, and the loudspeaker 271 converts the electrical signal into a sound signal and outputs the sound signal. In addition, the microphone 272 converts a collected sound signal into an electrical signal; the audio circuit 27 receives the electrical signal, converts the electrical signal into audio data, and outputs the audio data to the RF circuit 22; and then, the audio data is sent to, for example, another mobile phone, or the audio data is output to the memory 24 for further processing.

Optionally, the mobile phone may further include various sensors (for example, a gyro sensor, a hygrometer sensor, an infrared sensor, or a magnetometer sensor), a wireless fidelity (Wi-Fi for short) module, a Bluetooth module, and the like. These components are not shown in FIG. 2.

In FIG. 1, the network device 11 in this embodiment of this application may receive PH information from the terminal device 10, and implement resource scheduling for the terminal device 10 based on the PH information received by the network device 11. The network device 11 may be a radio access point (AP), an evolved NodeB (eNB for short), or an NR gNB. The NR gNB represents a base station in a 5th generation communications technology (5G) network. This is not specifically limited in this embodiment of this application. In FIG. 1, a base station is used to represent the network device 11.

Figure 3:
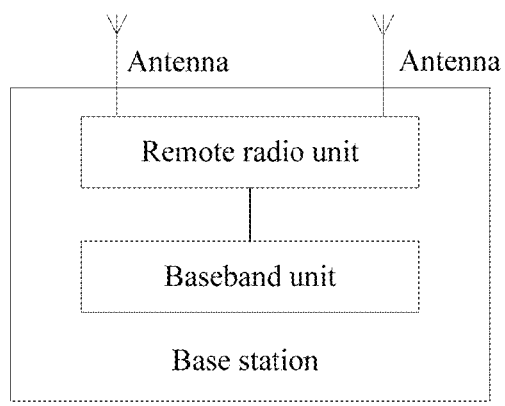
FIG. 3 is a schematic diagram of a hardware structure of a base station according to an embodiment of this application.

For example, in this embodiment of this application, the network device 11 shown in FIG. 1 is any one of the foregoing base stations. The following describes constituent parts of the base station in detail with reference to FIG. 3. As shown in FIG. 3, the base station includes a baseband unit (BBU), a remote radio unit (RRU), and an antenna. The BBU and the RRU may be connected through an optical fiber. The RRU is then connected to the antenna through a coaxial cable and a power splitter (a coupler). One BBU may be usually connected to a plurality of RRUs.

The RRU may include four modules: a digital intermediate frequency module, a transceiver module, a power amplification module, and a filtering module. The digital intermediate frequency module is configured to perform modulation and demodulation, digital up/down frequency conversion, digital-to-analog conversion, and the like for optical transmission. The transceiver module completes conversion from an intermediate frequency signal to a radio frequency signal. The radio frequency signal is amplified by the power amplification module and filtered by the filtering module, and then a processed radio frequency signal is transmitted by using the antenna.

The BBU is configured to implement a baseband processing function (encoding, multiplexing, modulation, spectrum spreading, and the like) of a Uu interface (that is, an interface between a terminal device and a base station), an interface function of a logical interface between a radio network controller (RNC) and a base station, signaling processing, local and remote operation and maintenance functions, working status monitoring and alarm information reporting functions of a base station system, and the like.

The following specifically explains the power headroom transmission method provided in this embodiment of this application.

The power headroom transmission method provided in this embodiment of this application may be applied to the communications system shown in FIG. 1. It can be learned from the foregoing description that the terminal device 10 in this embodiment of this application supports use of two different types of waveforms for data transmission. An example in which the terminal device supports use of the first waveform and the second waveform for data transmission is used for description. A maximum power of the terminal device when data is transmitted by using the first waveform is a first maximum power $P_{MAX1}$, and a maximum power of the terminal device when data is transmitted by using the second waveform is a second maximum power $P_{MAX2}$. The first power headroom information is used to indicate power headroom $PH_1$ of the terminal device when data is transmitted by using the first waveform, and the second power headroom information is used to indicate power headroom $PH_2$ of the terminal device when data is transmitted by using the second waveform. A first configuration transmit power $P_{C-Data1}$ is a power configured by the network device for the terminal device when a PUSCH of the terminal device is transmitted by using the first waveform, and a second configuration transmit power $P_{C-Data2}$ is a power configured by the network device for the terminal device when the PUSCH of the terminal device is transmitted by using the second waveform. A difference between the first configuration transmit power and the second configuration transmit power is a second power difference $\Delta P_{C-Data}$.

Specifically, the power headroom transmission method provided in this embodiment of this application may be as follows.

(1) A difference between the first maximum power and the second maximum power is $\Delta_M$. The terminal device determines the first power headroom information and $\Delta_M$, and sends the first power headroom information and $\Delta_M$ to the network device. Correspondingly, the network device receives the first power headroom information and $\Delta_M$ that are sent by the terminal device. In addition, the network device further obtains the second power difference. In this way, the network device can determine the second power headroom information based on the first power headroom information, $\Delta_M$, and the second power difference, and further implement resource scheduling for the terminal device based on the first power headroom information and the second power headroom information.

(2) The terminal device determines the first power headroom information and the second power headroom information, and sends, to the network device, the first power headroom information and the second power headroom information that are determined by the terminal device, so that the network device implements resource scheduling for the terminal device based on the first power headroom information and the second power headroom information.

Figure 4:
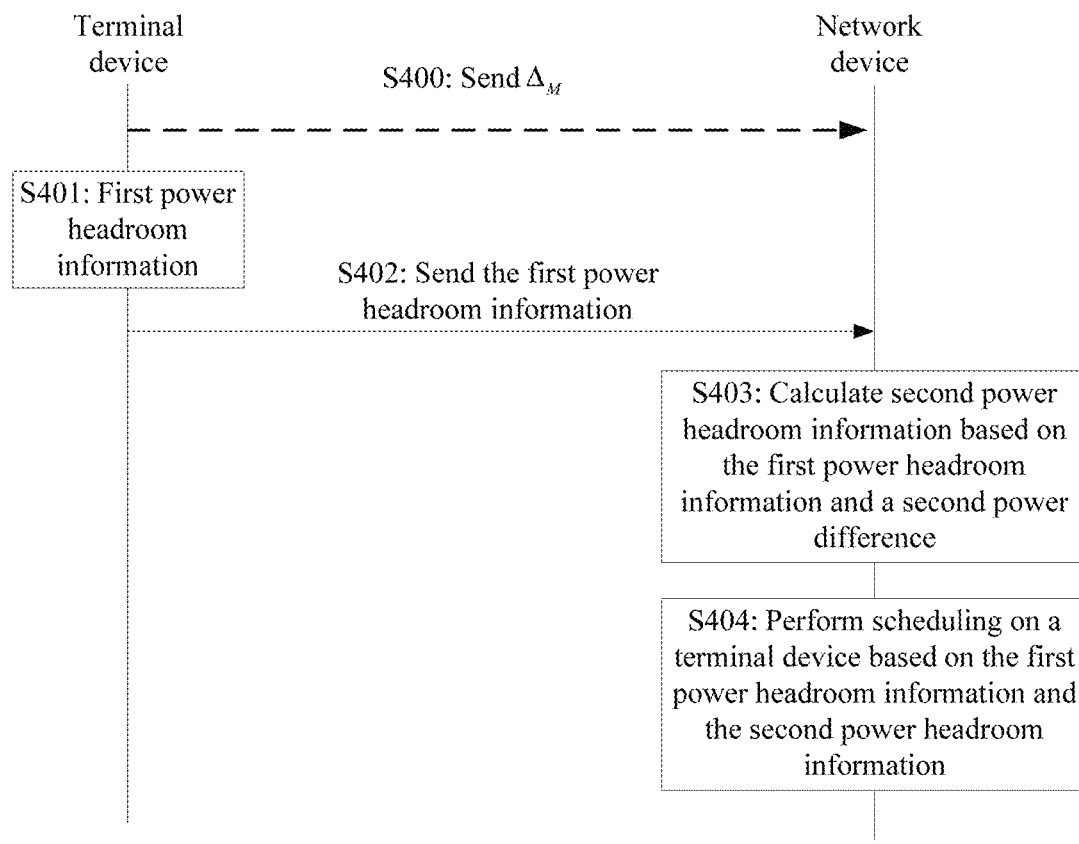
FIG. 4 is a first schematic flowchart of a power headroom transmission method according to an embodiment of this application.

The foregoing method (1) is first described herein. As shown in FIG. 4, a power headroom transmission method provided in an embodiment of this application includes the following steps.

S400 (optional): A terminal device sends $\Delta_M$ to a network device.

$\Delta_M$ in this embodiment of this application may be preconfigured by a system, or may be calculated by the terminal device based on a first maximum power $P_{MAX1}$ and a second maximum power $P_{MAX2}$, for example, $\Delta_M = P_{MAX1} - P_{MAX2}$.

In a scenario in which the terminal device calculates $\Delta_M$ based on the first maximum power and the second maximum power, the terminal device further needs to send $\Delta_M$ calculated by the terminal device to the network device.

Optionally, a method for sending, by the terminal device, $\Delta_M$ to the network device may be: sending, by the terminal device to the network device, an initial access Msg3 message that carries $\Delta_M$, or during PUSCH transmission, sending, by the terminal device to the network device, higher layer signaling that carries $\Delta_M$. This is not specifically limited in this embodiment of this application.

Optionally, the terminal device may send $\Delta_M$ to the network device after receiving a message that is used to instruct to report $\Delta_M$ and that is sent by the network device, or may send $\Delta_M$ to the network device based on a system configuration. This is not specifically limited in this embodiment of this application.

Because S400 is an optional step, S400 is represented by a dashed line in FIG. 4.

S401: The terminal device determines first power headroom information.

It can be learned from the foregoing description that the terminal device supports use of a first waveform and a second waveform for data transmission. In this case, the terminal device can determine the first power headroom information or second power headroom information. Optionally, the terminal device may determine, based on the system preconfiguration, which power headroom information is to be calculated, or may determine, in case of receiving higher layer signaling sent by the network device, which power headroom information is to be calculated. This is not specifically limited in this embodiment of this application.

An example in which the terminal device determines the first power headroom information is used for description in this embodiment of this application.

Specifically, when a PUSCH of the terminal device is transmitted by using the first waveform, the terminal device determines the first power headroom information based on the first maximum power $P_{MAX1}$ and a first configuration transmit power $P_{C\text{-}Data1}$.

For example, the terminal device calculates the first power headroom information according to a formula (3) and a formula (4):

$$PH_1 = P_{MAX1} - P_{C\text{-}Data1} \quad (3)$$

$$P_{C\text{-}Data1} = 10\log_{10}M_1 + P_0 + \alpha \cdot PL + \Delta_{TF} + f \quad (4)$$

where $M_1$ is a quantity of resource blocks occupied by the PUSCH of the terminal device when the PUSCH of the terminal device is transmitted by using the first waveform, that is, a quantity of RBs scheduled for the PUSCH of the terminal device when the PUSCH of the terminal device is transmitted by using the first waveform. For content of other parameters, refer to the description of the formula (1). Details are not described herein again.

When the PUSCH of the terminal device is transmitted without using the first waveform but by using the second waveform, the terminal device may determine the first power headroom information based on the first maximum power $P_{MAX1}$ and a second configuration transmit power $P_{C\text{-}Data2}$.

For example, when the PUSCH of the terminal device is transmitted without using the first waveform but by using the second waveform, the terminal device calculates the first power headroom information according to a formula (5) and a formula (6):

$$PH_1 = P_{MAX1} - P_{C\text{-}Data2} \quad (5)$$

$$P_{C\text{-}Data2} = 10\log_{10}M_2 + P_0 + \alpha \cdot PL + \Delta_{TF} + f \quad (6)$$

where $M_2$ is a quantity of resource blocks occupied by the PUSCH of the terminal device when the PUSCH of the terminal device is transmitted by using the second waveform, that is, a quantity of RBs scheduled for the PUSCH of the terminal device when the PUSCH of the terminal device is transmitted by using the second waveform. For content of other parameters, refer to the description of the formula (1). Details are not described herein again.

When the PUSCH of the terminal device is transmitted without using the first waveform but by using the second waveform, the terminal device determines the first power headroom information based on the first maximum power $P_{MAX1}$ and a second configuration transmit power $P_{C\text{-}Data2}$. Alternatively, a method for determining, by the terminal device, the first power headroom information may be: determining, by the terminal device, the first power headroom information according to a preset formula without considering PUSCH scheduling.

For example, when the PUSCH of the terminal device is transmitted without using the first waveform but by using the second waveform, the terminal device calculates the first power headroom information according to the formula (3) and a formula (7):

$$P_{C\text{-}Data1} = P_0 + \alpha \cdot PL + f \quad (7).$$

When the PUSCH of the terminal device is transmitted neither by using the first waveform nor by using the second waveform, the terminal device determines the first power headroom information according to a preset formula without considering PUSCH scheduling. For the preset formula herein, refer to the formula (3) and the formula (7).

S402: The terminal device sends the first power headroom information to the network device.

Specifically, when a preset condition is satisfied, the terminal device sends the first power headroom information to the network device in case of adding the first power headroom information to a MAC CE.

The preset condition is at least one of the following: a first timer exceeds first preset duration, a change amount of a path loss relative to a path loss corresponding to previous reporting of power headroom information is greater than or equal to a first preset threshold, and a quantity of to-be-stuffed bits of a transmission resource is greater than a third preset threshold.

S403: The network device calculates the second power headroom information based on the first power headroom information, $\Delta_M$, and a second power difference.

Optionally, if the terminal device sends $\Delta_M$ to the network device in S400, the network device receives $\Delta_M$ from the terminal device. If $\Delta_M$ is pre-configured by the system, the network device may directly obtain $\Delta_M$.

The second power difference $\Delta P_{C\text{-}Data}$ is a difference between the first configuration transmit power and the second configuration transmit power. The network device may directly obtain the second power difference.

With reference to the formula (1) and the formula (2), when the network device obtains the first power headroom information, $\Delta_M$, and the second power difference, the network device may calculate the second power headroom information.

For example, the network device may calculate the second power headroom information $PH_2$ according to the following formula:

$$PH_2 = PH_1 - \Delta_M + \Delta P_{C\text{-}Data} \text{ or } PH_2 = PH_1 + \Delta_M - \Delta P_{C\text{-}Data}.$$

S404: The network device performs scheduling on the terminal device based on the first power headroom information and the second power headroom information.

Further, when only the first waveform or the second waveform supports SS, the terminal device further sends first power difference information corresponding to the waveform or additional power information corresponding to the waveform to the network device, so that the network device determines power headroom information of the terminal device that is under action of SS, thereby scheduling a resource for the terminal device more sufficiently.

A value of a first power difference corresponding to the waveform is equal to a difference between a maximum transmit power of the terminal device when the waveform is modulated by using a first modulation scheme to which SS is added and a maximum transmit power of the terminal device when the waveform is modulated by using a second modulation scheme. A value of an additional power is equal to a difference between a maximum transmit power of the terminal device when the waveform is modulated by using a first modulation scheme to which SS is added and a maximum transmit power of the terminal device when the waveform is modulated by using a first modulation scheme to which SS is not added.

The first modulation scheme may be a modulation scheme in which bandwidth used by the terminal device is not expanded or is expanded slightly after SS is added, for example, a pi/2 binary phase shift keying (Binary Phase Shift Keying, BPSK) modulation scheme.

The second modulation scheme may be a modulation scheme in which the bandwidth used by the terminal device is expanded relatively significantly after SS is added, for example, a quadrature phase shift keying (QPSK) scheme.

An example in which the first modulation scheme is a pi/2-BPSK modulation scheme and the second modulation scheme is a QPSK modulation scheme is used for description in this embodiment of this application. A maximum power of the terminal device is represented by $P_{MAX11}$ when the first waveform is modulated by using the pi/2-BPSK modulation scheme to which SS is added, and a maximum transmit power of the terminal device is represented by $P_{MAX12}$ when the first waveform is modulated by using the QPSK modulation scheme. First power headroom information calculated by the terminal device by using $P_{MAX11}$ is represented by $PH_{11}$, and first power headroom information calculated by the terminal device by using $P_{MAX12}$ is represented by $PH_{12}$. A first power difference corresponding to the first waveform is represented by $\Delta P_{10}$, and an additional power corresponding to the first waveform is represented by $\Delta P_{11}$. A maximum power of the terminal device is represented by $P_{MAX21}$ when the second waveform is modulated by using the pi/2-BPSK modulation scheme to which SS is added, and a maximum transmit power of the terminal device is represented by $P_{MAX22}$ when the second waveform is modulated by using the QPSK modulation scheme. Second power headroom information calculated by the terminal device by using $P_{MAX21}$ is represented by $PH_{21}$, and second power headroom information calculated by the terminal device by using $P_{MAX22}$ is represented by $PH_{22}$. A first power difference corresponding to the second waveform is represented by $\Delta P_{20}$, and an additional power corresponding to the second waveform is represented by $\Delta P_{21}$.

Specifically, in a scenario in which modulation of the first waveform by using the pi/2-BPSK modulation scheme to which SS is added is supported, but modulation of the second waveform by using the pi/2-BPSK modulation scheme to which SS is added is not supported, in a case of protocol-transparent SS (the terminal device transparently transmits data to the network device, and the network device cannot learn whether the first waveform is modulated by using the pi/2-BPSK modulation scheme to which SS is added), for the network device, modulation of the first waveform by using the pi/2-BPSK modulation scheme to which SS is not added does not differ from modulation of the first waveform by using the pi/2-BPSK modulation scheme to which SS is added. In this case, the terminal device sends $PH_{11}$ and $\Delta P_{10}$ to the network device, or the terminal device sends $PH_{12}$ and $\Delta P_{10}$ to the network device.

If the terminal device sends $PH_{11}$ and $\Delta P_{10}$ to the network device, the network device may obtain the second power headroom information $PH_2$ according to the following formula (8) or the following formula (9):

$$PH_2 = PH_{11} - \Delta_M + \Delta P_{C\text{-}Data} - \Delta P_{10} \tag{8}$$

$$PH_2 = PH_{11} + \Delta_M - \Delta P_{C\text{-}Data} - \Delta P_{10} \tag{9}.$$

If the terminal device sends $PH_{12}$ and $\Delta P_{10}$ to the network device, the network device may obtain the second power headroom information $PH_2$ according to the following formula (10) or the following formula (11):

$$PH_2 = PH_{12} - \Delta_M + \Delta P_{C\text{-}Data} + \Delta P_{10} \tag{10}$$

$$PH_2 = PH_{12} + \Delta_M - \Delta P_{C\text{-}Data} + \Delta P_{10} \tag{11}.$$

In a scenario in which modulation of the first waveform by using the pi/2-BPSK modulation scheme to which SS is added is supported, but modulation of the second waveform by using the pi/2-BPSK modulation scheme to which SS is added is not supported, in a case of non-protocol-transparent SS (the network device can learn whether the first waveform is modulated by using the pi/2-BPSK modulation scheme to which SS is added), the terminal device sends $PH_{11}$ and $\Delta P_{11}$ to the network device, or the terminal device sends $PH_{12}$ and $\Delta P_{11}$ to the network device.

If the terminal device sends $PH_{11}$ and $\Delta P_{11}$ to the network device, the network device may obtain the second power headroom information $PH_2$ according to the following formula (12) or the following formula (13):

$$PH_2 = PH_{11} - \Delta_M + \Delta P_{C\text{-}Data} - \Delta P_{11} \tag{12}$$

$$PH_2 = PH_{11} + \Delta_M - \Delta P_{C\text{-}Data} - \Delta P_{11} \quad (13).$$

If the terminal device sends $PH_{12}$ and $\Delta P_{11}$ to the network device, the network device may obtain the second power headroom information $PH_2$ according to the following formula (14) or the following formula (15):

$$PH_2 = PH_{12} - \Delta_M + \Delta P_{C\text{-}Data} + \Delta P_{11} \quad (14)$$

$$PH_2 = PH_{12} + \Delta_M - \Delta P_{C\text{-}Data} + \Delta P_{11} \quad (15).$$

Under action of SS, a maximum transmit power of the terminal device increases after the first waveform is modulated by using the pi/2-BPSK modulation scheme to which SS is added. Therefore, the network device can schedule a resource for the terminal device more sufficiently based on $PH_{11}$ and $PH_2$.

Specifically, in a scenario in which modulation of the first waveform by using the pi/2-BPSK modulation scheme to which SS is added is not supported, but modulation of the second waveform by using the pi/2-BPSK modulation scheme to which SS is added is supported, in a case of protocol-transparent SS, the terminal device sends $PH_{11}$ and $\Delta P_{20}$ to the network device, or the terminal device sends $PH_{12}$ and $\Delta P_{20}$ to the network device.

If the terminal device sends $PH_{10}$ and $\Delta P_{20}$ to the network device, the network device may obtain $PH_{22}$ according to the following formula (16) or the following formula (17):

$$PH_{22} = PH_{10} - \Delta_M + \Delta P_{C\text{-}Data} + \Delta P_{20} \quad (16)$$

$$PH_{22} = PH_{10} + \Delta_M - \Delta P_{C\text{-}Data} + \Delta P_{20} \quad (17).$$

If the terminal device sends $PH_{12}$ and $\Delta P_{20}$ to the network device, the network device may obtain the second power headroom information $PH_{22}$ according to the following formula (18) or the following formula (19):

$$PH_{22} = PH_{12} - \Delta_M + \Delta P_{C\text{-}Data} + \Delta P_{20} \quad (18)$$

$$PH_{22} = PH_{12} + \Delta_M - \Delta P_{C\text{-}Data} + \Delta P_{20} \quad (19).$$

In a scenario in which modulation of the first waveform by using the pi/2-BPSK modulation scheme to which SS is added is not supported, but modulation of the second waveform by using the pi/2-BPSK modulation scheme to which SS is added is supported, in a case of non-protocol-transparent SS, the terminal device sends $PH_{10}$ and $\Delta P_{21}$ to the network device, or the terminal device sends $PH_{12}$ and $\Delta P_{21}$ to the network device.

If the terminal device sends $PH_{10}$ and $\Delta P_{21}$ to the network device, the network device may obtain $PH_{22}$ according to the following formula (20) or the following formula (21):

$$PH_{22} = PH_{10} - \Delta_M + \Delta P_{C\text{-}Data} + \Delta P_{21} \quad (20)$$

$$PH_{22} = PH_{10} + \Delta_M - \Delta P_{C\text{-}Data} + \Delta P_{21} \quad (21).$$

If the terminal device sends $PH_{12}$ and $\Delta P_{21}$ to the network device, the network device may obtain $PH_{22}$ according to the following formula (22) or the following formula (23):

$$PH_{22} = PH_{12} - \Delta_M + \Delta P_{C\text{-}Data} + \Delta P_{21} \quad (22)$$

$$PH_{22} = PH_{12} + \Delta_M - \Delta P_{C\text{-}Data} + \Delta P_{21} \quad (23).$$

Under action of SS, a maximum transmit power of the terminal device increases after the second waveform is modulated by using the pi/2-BPSK modulation scheme to which SS is added. Therefore, the network device can schedule a resource for the terminal device more sufficiently based on $PH_1$ and $PH_{22}$.

When both the first waveform and the second waveform support SS, the terminal device may also send first power difference information corresponding to each waveform or additional power difference information corresponding to each waveform to the network device, or may no longer send first power difference information corresponding to each waveform or additional power difference information corresponding to each waveform to the network device. This is not specifically limited in this embodiment of this application.

According to the power headroom information transmission method provided in this embodiment, in a scenario in which the terminal device determines and reports the first power headroom information and $\Delta_M$, the network device determines the second power headroom information based on the obtained $\Delta_M$, the obtained second power difference, and the obtained first power headroom information. In this way, the network device can obtain the first power headroom information and the second power headroom information, so that the network device implements resource scheduling for the terminal device based on the first power headroom information and the second power headroom information. In terms of the terminal device, the terminal device sends only the first power headroom information to the network device, so that overheads of communications signaling between the terminal device and the network device are reduced.

Figure 5:
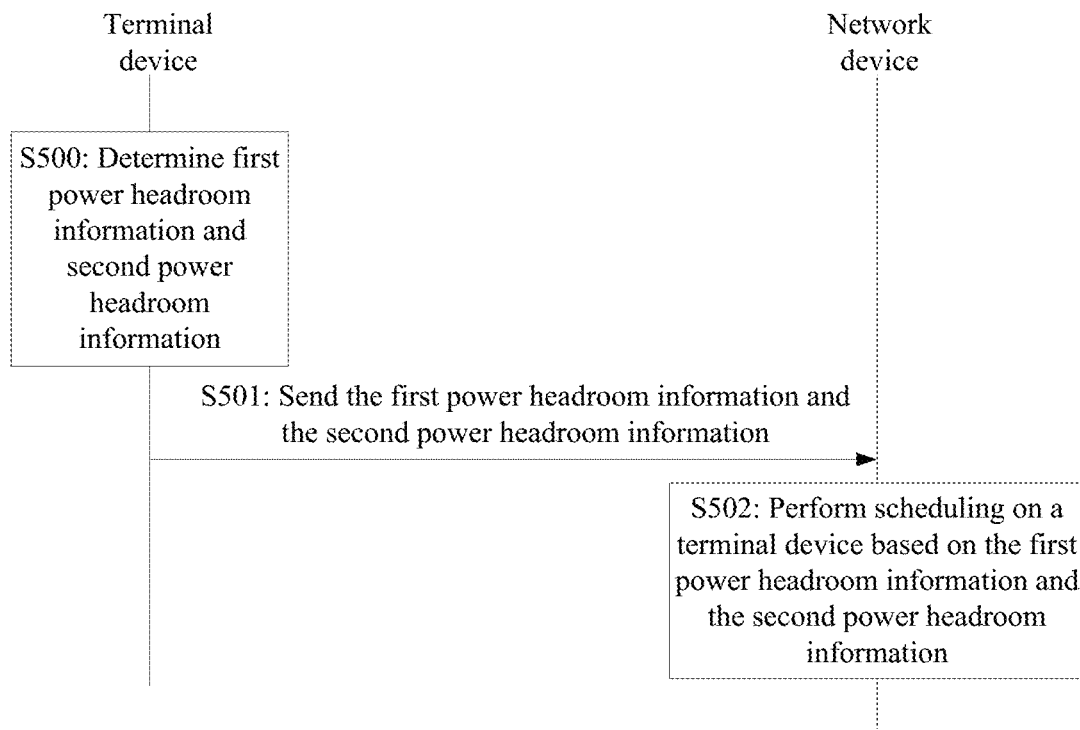
FIG. 5 is a second schematic flowchart of a power headroom transmission method according to an embodiment of this application.

The foregoing method (2) is described herein. As shown in FIG. 5, a power headroom transmission method provided in an embodiment of this application includes the following steps.

S500: A terminal device determines first power headroom information and second power headroom information.

The first power headroom information is information about a value of first power headroom. For a method for determining, by the terminal device, the first power headroom information, refer to the description of S401. Details are not described herein again.

The second power headroom information is information about a value of second power headroom or information about a power headroom difference, and the power headroom difference is a difference between the second power headroom and the first power headroom.

A quantity of bits occupied by the power headroom difference is usually less than a quantity of bits occupied by the value of the second power headroom. Therefore, using the power headroom difference rather than the value of the second power headroom to represent the second power headroom information can reduce overheads of communications signaling between the terminal device and a network device.

If the second power headroom information is the information about the value of the second power headroom, a method for determining the second power headroom information by the terminal device is similar to the method for determining the first power headroom information by the terminal device. Details are not described herein again.

If the second power headroom information is the information about the power headroom difference, a method for determining the second power headroom information by the terminal device may be: determining, by the terminal device, the information about the value of the first power headroom and the information about the value of the second power headroom, and determining the information about the power headroom difference based on the information about the value of the first power headroom and the information about the value of the second power headroom; or determining, by the terminal device, the information about the value of the first power headroom and $\Delta_M$, and determining the information about the power headroom difference based on the information about the value of the first power headroom and $\Delta_M$.

S501: The terminal device sends the first power headroom information and the second power headroom information to the network device.

Optionally, the terminal device may send both the first power headroom information and the second power headroom information to the network device based on a system preconfiguration. In this way, the network device can directly obtain the first power headroom information and the second power headroom information.

Optionally, when one preset report condition is satisfied, the terminal device sends target power headroom information to the network device, where the target power headroom information is the first power headroom information or the second power headroom information. When another preset report condition is satisfied, the terminal device sends the first power headroom information and the second power headroom information to the network device.

The foregoing one preset report condition is that reporting of the target power headroom information is triggered when any one of the following conditions is satisfied:

(1A) a first preset report condition: A first timer exceeds first preset duration;

(2A) a third preset report condition: A change amount of a path loss relative to a path loss corresponding to previous reporting of power headroom information is greater than or equal to a first preset threshold; and (3A) a fifth preset report condition: A quantity of to-be-stuffed bits of a transmission resource is greater than or equal to a third preset threshold.

The foregoing another preset report condition is that reporting of the first power headroom information and the second power headroom information is triggered when any one of the following conditions is satisfied:

(1B) a second preset report condition: A second timer exceeds second preset duration, where the second timer may coexist with the first timer, and the second preset duration is usually greater than the first preset duration;

(2B) a fourth preset report condition: The change amount of the path loss relative to the path loss corresponding to the previous reporting of power headroom information is greater than or equal to a second preset threshold; and (3B) a sixth preset report condition: The quantity of the to-be-stuffed bits of the transmission resource is greater than or equal to a fourth preset threshold.

It should be noted that when both the foregoing one preset report condition and the foregoing another preset report condition are satisfied, the terminal device sends the first power headroom information and the second power headroom information to the network device.

Optionally, the terminal device may alternatively send the first power headroom information and the second power headroom information to the network device within a preset time period based on configuration information sent by the network device.

For example, if the configuration information is used to instruct the terminal device to send, within the preset time period (for example, 20 seconds after the configuration information is received), power headroom information to the network device twice (once every 10 seconds), and to send both the first power headroom information and the second power headroom information each time. In this case, the terminal device sends the first power headroom information and the second power headroom information to the network device once every 10 seconds for a total of two times after receiving the configuration information.

Under any one of the foregoing preset report conditions, the terminal device sends the first power headroom information and the second power headroom information to the network device in a form of a MAC CE. For details, refer to the description of S402. Details are not described herein again.

S502: The network device performs scheduling on the terminal device based on the first power headroom information and the second power headroom information.

In addition, a first waveform or a second waveform in this embodiment may alternatively support SS. In this embodiment, for a case in which the first waveform or the second waveform supports SS, refer to the description of supporting SS by the first waveform in the embodiment shown in FIG. 4. Details are not described herein again.

The network device in this embodiment may directly obtain the first power headroom information and the second power headroom information, so that the network device implements resource scheduling for the terminal device based on the first power headroom information and the second power headroom information.

An embodiment of this application provides a terminal device. The terminal device is configured to perform steps performed by the terminal device in the foregoing power headroom transmission method. The terminal device provided in this embodiment of this application may include modules corresponding to corresponding steps.

In this embodiment of this application, functional module division may be performed on the terminal device based on the foregoing method examples. For example, functional module division may be performed in correspondence to functions, or at least two functions may be integrated into one processing module. The integrated module may be implemented in a form of hardware, or may be implemented in a form of a software functional module. The module division in this embodiment of this application is an example, is merely logical function division, and may be other division in actual implementation.

Figure 6:
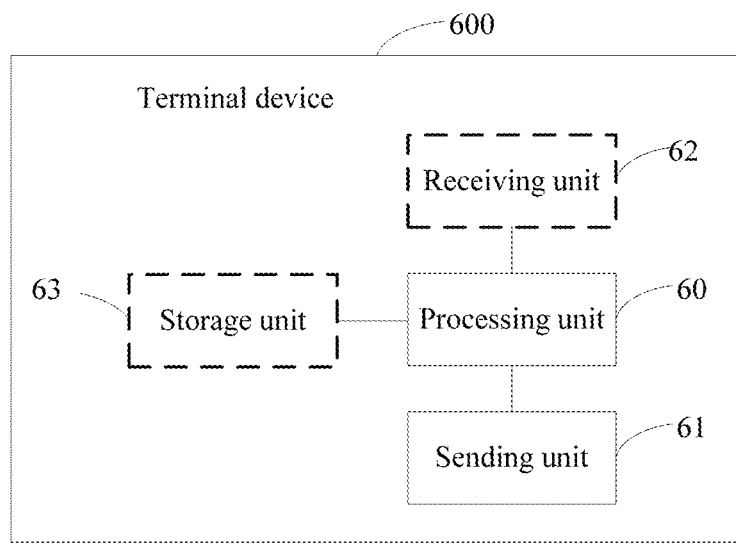
FIG. 6 is a schematic structural diagram of a terminal device according to an embodiment of this application.

When functional module division is performed in correspondence to functions, FIG. 6 is a possible schematic structural diagram of the terminal device in the foregoing embodiments. As shown in FIG. 6, the terminal device 600 includes a processing unit 60 and a sending unit 61. The processing unit 60 is configured to support the terminal device 600 in performing S401, and/or S500, and the like in the foregoing embodiments, and/or another process of a technology described in this specification. The sending unit 61 is configured to support the terminal device 600 in performing S400, S402, and/or S501, and the like in the foregoing embodiments, and/or another process of the technology described in this specification. All related content of the steps in the foregoing method embodiments may be cited in function descriptions of corresponding functional modules. Details are not described herein again. Certainly, the terminal device 600 provided in this embodiment of this application includes but is not limited to the foregoing modules. For example, the terminal device 600 may further include a receiving unit 62 and a storage unit 63. The receiving unit 62 is configured to communicate with another device. The storage unit 63 may be configured to store at least one of first power headroom information and second power headroom information, and may be further configured to store program code and data that are of the terminal device.

When an integrated unit is used, the processing unit 60 in this embodiment of this application may be the processor 21 in FIG. 2, the sending unit 61 and the receiving unit 62 may be the RF circuit 22 and an antenna connected to the RF circuit 22 in FIG. 2, and the storage unit 63 may be the memory 24 in FIG. 2.

When the terminal device 600 runs, the terminal device 600 performs the power headroom transmission method in the embodiment shown in FIG. 4 or FIG. 5. For details about the power headroom transmission method, refer to a related description in the embodiment shown in FIG. 4 or FIG. 5. Details are not described herein again.

Another embodiment of this application further provides a computer readable storage medium. The computer readable storage medium includes one or more pieces of program code. The one or more programs include an instruction. When a processor in the terminal device 600 executes the program code, the terminal device 600 performs the power headroom transmission method shown in FIG. 4 or FIG. 5.

In another embodiment of this application, a computer program product is further provided. The computer program product includes a computer executable instruction, and the computer executable instruction is stored in a computer readable storage medium. At least one processor of a terminal device may read the computer executable instruction from the computer readable storage medium. When the at least one processor executes the computer executable instruction, the terminal device is enabled to perform steps performed by the source terminal device in the power headroom transmission method shown in FIG. 4 or FIG. 5.

An embodiment of this application provides a network device. The network device is configured to perform steps performed by the network device in the foregoing power headroom transmission method. The network device provided in this embodiment of this application may include modules corresponding to corresponding steps.

In this embodiment of this application, functional module division may be performed on the network device based on the foregoing method examples. For example, functional module division may be performed in correspondence to functions, or at least two functions may be integrated into one processing module. The integrated module may be implemented in a form of hardware, or may be implemented in a form of a software functional module. The module division in this embodiment of this application is an example, is merely logical function division, and may be other division in actual implementation.

Figure 7:
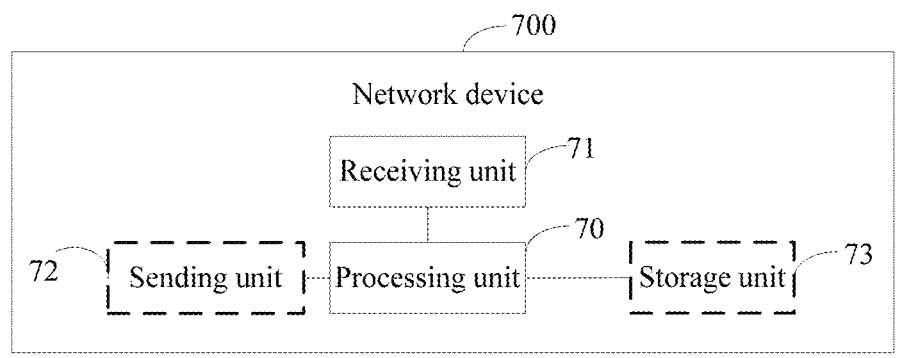
FIG. 7 is a first schematic structural diagram of a network device according to an embodiment of this application.

When functional module division is performed in correspondence to functions, FIG. 7 is a possible schematic structural diagram of the network device in the foregoing embodiments. As shown in FIG. 7, the network device 700 includes a processing unit 70 and a receiving unit 71. The processing unit 70 is configured to support the network device 700 in performing S403, S404, and/or S502, and the like in the foregoing embodiments. In addition, the processing unit 70 is further configured to obtain a second power difference; and when $\Delta_M$ is preset by a system, the processing unit 70 may be further configured to obtain $\Delta_M$, and/or is configured to perform another process of a technology described in this specification. The receiving unit 71 is configured to support the network device 700 in performing S400, S402, S501, and the like in the foregoing embodiments, and/or another process of the technology described in this specification. All related content of the steps in the foregoing method embodiments may be cited in function descriptions of corresponding functional modules. Details are not described herein again. Certainly, the network device 700 provided in this embodiment of this application includes but is not limited to the foregoing modules. For example, the network device 700 may further include a sending unit 72 and a storage unit 73. The sending unit 72 is configured to communicate with another device. The storage unit 73 may be configured to store first power headroom information and second power headroom information, and may be further configured to store program code and data that are of the network device 700.

It should be noted that all related content of the steps in the foregoing method embodiments may be cited in function descriptions of corresponding functional modules. Details are not described herein again.

Figure 8:
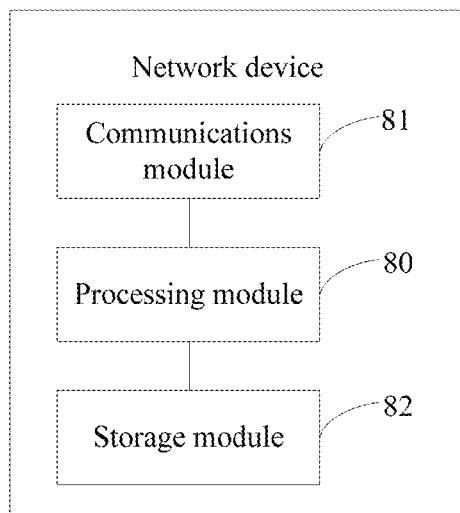
FIG. 8 is a second schematic structural diagram of a network device according to an embodiment of this application.

For example, when an integrated unit is used, FIG. 8 is a schematic structural diagram of a network device according to an embodiment of this application. In FIG. 8, the network device includes a processing module 80 and a communications module 81. The processing module 80 is configured to control and manage an action of the network device. For example, the processing module 80 is configured to perform steps performed by the processing unit 70, and/or is configured to perform another process of a technology described in this specification. The communications module 81 is configured to support interaction between the network device and another device, for example, perform steps performed by the receiving unit 71 and the sending unit 72. As shown in FIG. 8, the network device may further include a storage module 82. The storage module 82 is configured to store program code and data that are of the network device, for example, store content stored by the storage unit 73.

The processing module 80 may be a processor or a controller in the network device, for example, a central processing unit (CPU), a general-purpose processor, or a digital signal processor (DSP). The processing module 80 may implement or execute various example logical blocks, modules, and circuits described with reference to content disclosed in the embodiments of this application. The communications module 81 may be a transceiver, a transceiver circuit, a transceiver, or the like. The storage module 82 may be a memory.

Figure 9:
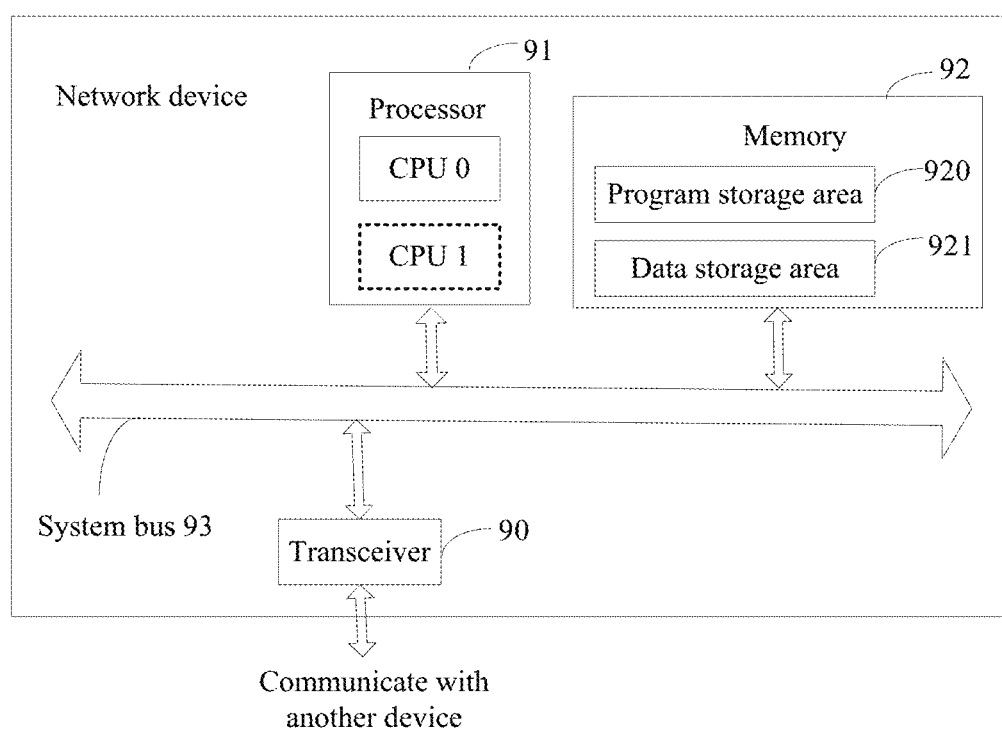
FIG. 9 is a third schematic structural diagram of a network device according to an embodiment of this application.

When the processing module 80 is a processor, the communications module 81 is a transceiver, and the storage module 82 is a memory, the network device in this embodiment of this application may be a network device shown in FIG. 9.

As shown in FIG. 9, the network device includes a transceiver 90, a processor 91, and a memory 92. The transceiver 90, the processor 91, and the memory 92 are connected through a system bus 93, and complete communication between each other.

When the network device runs, the network device performs the power headroom transmission method in the embodiment shown in FIG. 4 or FIG. 5. For details about the power headroom transmission method, refer to a related description in the embodiment shown in FIG. 4 or FIG. 5. Details are not described herein again.

The transceiver 90 is configured to communicate with another device or a communications network, for example, an Ethernet or a WLAN.

The memory 92 is configured to store first power headroom information and second power headroom information, and may be further configured to store a software program and an application module. The processor 91 performs various function applications and data processing of the network device by running the software program and the application module that are stored in the memory 92.

The memory 92 may mainly include a program storage area 920 and a data storage area 921. The program storage area 920 may store an operating system, an application program required by at least one function, for example, configuration information sending. The data storage area 921 may store the first power headroom information and the second power headroom information that are obtained by the network device.

The memory 92 may include a volatile memory, for example, a random access memory (RAM). The memory may alternatively include a nonvolatile memory, for example, a read-only memory (ROM), a flash memory, a hard disk drive (HDD), a solid-state drive (SSD), a magnetic disk storage medium or another magnetic storage device, or any other medium that can be configured to carry or store expected program code in a form of an instruction or a data structure and that is accessible by the network device, but is not limited thereto.

The memory 92 may independently exist, and may be connected to the processor 91 through the system bus 93. The memory 92 may be alternatively integrated with the processor 91.

The processor 91 is a control center of the network device. The processor 91 is connected to all the parts of the entire network device by using various interfaces and lines, and by running or executing the software program and/or the application module that are/is stored in the memory 92 and by invoking data stored in the memory 92, performs various functions and data processing of the network device, so as to perform overall monitoring on the network device.

In specific implementation, in an embodiment, the processor 91 may include one or more CPUs. For example, the processor 91 in FIG. 9 includes a CPU 0 and a CPU 1.

The system bus 93 may be a peripheral component interconnect (PCI) bus, an extended industry standard architecture (EISA) bus, or the like.

The system bus 93 may be classified into an address bus, a data bus, a control bus, and the like. For a clear description, various buses are all denoted as the system bus 93 in FIG. 9 in this embodiment of this application.

Correspondingly, an embodiment of this application further provides a computer readable storage medium, where the computer readable storage medium stores an instruction. When the instruction is run on a network device, the network device is enabled to perform steps performed by the network device in method procedures shown in the foregoing method embodiments.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instruction is loaded and executed on a computer, the procedure or functions according to the embodiments of this application are all or partially generated. The computer may be a general-purpose computer, a dedicated computer, a computer network, or another programmable apparatus. The computer instruction may be stored in a computer readable storage medium or may be transmitted from a computer readable storage medium to another computer readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

According to the foregoing descriptions about implementations, a person skilled in the art can clearly understand that, for the purpose of ease and brevity of description, only division of the foregoing functional modules is used as an example for description. In actual application, the foregoing functions can be allocated to different functional modules for implementation depending on requirements, that is, an inner structure of an apparatus is divided into different functional modules to perform all or some of the functions described above.

In the several embodiments provided in this application, it should be understood that the disclosed apparatus and method may be implemented in other manners. For example, the described apparatus embodiments are merely examples. For example, the module or unit division is merely logical function division and may be other division in actual implementation. For example, a plurality of units or components may be combined or may be integrated into another apparatus, or some features may be ignored or not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, may be located in one position, or may be distributed in a plurality of different positions. Some or all of the units may be selected depending on actual requirements, to achieve the objectives of the solutions of the embodiments.

In addition, functional units in the embodiments of this application may be integrated into one processing unit, or each of the units may exist alone physically, or at least two units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in a form of a software product. The software product is stored in a storage medium, and includes amount of instructions for instructing a device (which may be a single-chip microcomputer, a chip, or the like) or a processor (processor) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
   performing the following:
   determining, by a terminal device, first power headroom information and $\Delta_M$, wherein the first power headroom information indicates power headroom of the terminal device when data is transmitted using a first waveform, $\Delta_M$ is a difference between a first maximum power and a second maximum power, the first maximum power is a maximum power of the terminal device when data is transmitted using the first waveform, the second maximum power is a maximum power of the terminal device when data is transmitted using a second waveform, $\Delta_M>0$, the terminal device supports the first waveform and the second waveform being used for data transmission, and a type of the first waveform is different than a type of the second waveform; and
   sending, by the terminal device, the first power headroom information and $\Delta_M$ to a network device; or
   performing the following:
   determining, by the terminal device, first power headroom information and second power headroom information, wherein the first power headroom information indicates power headroom of the terminal device when data is transmitted using the first waveform, and the second power headroom information indicates power headroom of the terminal device when data is transmitted using the second waveform; and
   sending, by the terminal device, the first power headroom information and the second power headroom information to a network device.

2. The method according to claim 1, wherein an uplink channel of the terminal device is transmitted without using the first waveform, and determining, by the terminal device, the first power headroom information comprises:
   when the uplink channel of the terminal device is transmitted using the second waveform, calculating, by the terminal device, the first power headroom information based on a scheduling parameter that is used when the uplink channel of the terminal device is transmitted using the second waveform.

3. The method according to claim 1, wherein:
   the first waveform supports spectrum shaping (SS), and the method further comprises:
   sending, by the terminal device, first power difference information corresponding to the first waveform to the network device, wherein the first power difference information corresponding to the first waveform is information of a first power difference corresponding to the first waveform, the first power difference corresponding to the first waveform is a difference between a maximum transmit power of the terminal device when the first waveform is modulated using a first modulation scheme to which the SS is added and a maximum transmit power of the terminal device when the first waveform is modulated using a second modulation scheme; or
   sending, by the terminal device, an additional power corresponding to the first waveform to the network device, wherein the additional power corresponding to the first waveform is a difference between a maximum transmit power of the terminal device when the first waveform is modulated using a first modulation scheme to which SS is added and a maximum transmit power of the terminal device when the first waveform is modulated using a first modulation scheme to which SS is not added; or
   the second waveform supports SS, and the method further comprises:
   sending, by the terminal device, first power difference information corresponding to the second waveform to the network device, wherein the first power difference information corresponding to the second waveform is information of a first power difference corresponding to the second waveform, the first power difference corresponding to the second waveform is a difference between a maximum transmit power of the terminal device when the second waveform is modulated using a first modulation scheme to which SS is added and a maximum transmit power of the terminal device when the second waveform is modulated using a second modulation scheme; or
   sending, by the terminal device, an additional power corresponding to the second waveform to the network device, wherein the additional power corresponding to the second waveform is a difference between a maximum transmit power of the terminal device when the second waveform is modulated using a first modulation scheme to which SS is added and a maximum transmit power of the terminal device when the second waveform is modulated using a first modulation scheme to which SS is not added.

4. The method according to claim 1, wherein sending, by the terminal device, the first power headroom information and the second power headroom information to the network device comprises:
   in response to a first preset report condition being satisfied, sending, by the terminal device, target power headroom information to the network device, wherein the first preset report condition comprises that reporting of the target power headroom information is triggered in response to a first timer exceeding a first preset duration, and the target power headroom information is the first power headroom information or the second power headroom information; or
   in response to a second preset report condition being satisfied, sending, by the terminal device, the first power headroom information and the second power headroom information to the network device, wherein the second preset report condition comprises that reporting of the first power headroom information and the second power headroom information is triggered in response to a second timer exceeding a second preset duration, and the second timer coexists with the first timer; or
   in response to a third preset report condition being satisfied, sending, by the terminal device, target power headroom information to the network device, wherein the third preset report condition comprises that reporting of the target power headroom information is triggered in response to a change amount of a path loss relative to a path loss corresponding to a previous reporting of power headroom information being greater than or equal to a first preset threshold, and the target power headroom information is the first power headroom information or the second power headroom information; or in response to a fourth preset report condition being satisfied, sending, by the terminal device, the first power headroom information and the second power headroom information to the network device, wherein the fourth preset report condition comprises that reporting of the first power headroom information and the second power headroom information is triggered in response to the change amount of the path loss relative to the path loss corresponding to the previous reporting of power headroom information being greater than or equal to a second preset threshold; or in response to a fifth preset report condition being satisfied, sending, by the terminal device, target power headroom information to the network device, wherein the fifth preset report condition comprises that reporting of the target power headroom information is triggered in response to a quantity of to-be-stuffed bits of a transmission resource being greater than or equal to a third preset threshold, and the target power headroom information is the first power headroom information or the second power headroom information; or in response to a sixth preset report condition being satisfied, sending, by the terminal device, the first power headroom information and the second power headroom information to the network device, wherein the sixth preset report condition comprises that reporting of the first power headroom information and the second power headroom information is triggered in response to the quantity of the to-be-stuffed bits of the transmission resource being greater than or equal to a fourth preset threshold.

5. The method according to claim 1, wherein sending, by the terminal device, the first power headroom information and the second power headroom information to the network device comprises:

receiving configuration information sent by the network device, wherein the configuration information instructs to report the first power headroom information and the second power headroom information within a preset time period; and sending, by the terminal device, the first power headroom information and the second power headroom information to the network device within the preset time period based on the configuration information.

6. The method according to claim 5, wherein an uplink channel of the terminal device is transmitted without using the first waveform, and determining, by the terminal device, the first power headroom information comprises:

in response to the uplink channel of the terminal device being transmitted using the second waveform, calculating, by the terminal device, the first power headroom information based on a scheduling parameter that is used when the uplink channel of the terminal device is transmitted using the second waveform.

7. The method according to claim 5, wherein:

the first waveform supports spectrum shaping (SS), and the method further comprises:

sending, by the terminal device, first power difference information corresponding to the first waveform to the network device, wherein the first power difference information corresponding to the first waveform is information of a first power difference corresponding to the first waveform, the first power difference corresponding to the first waveform is a difference between a maximum transmit power of the terminal device when the first waveform is modulated using a first modulation scheme to which SS is added and a maximum transmit power of the terminal device when the first waveform is modulated using a second modulation scheme; or sending, by the terminal device, an additional power corresponding to the first waveform to the network device, wherein the additional power corresponding to the first waveform is a difference between a maximum transmit power of the terminal device when the first waveform is modulated using a first modulation scheme to which SS is added and a maximum transmit power of the terminal device when the first waveform is modulated using a first modulation scheme to which SS is not added; or the second waveform supports SS, and the method further comprises:

sending, by the terminal device, first power difference information corresponding to the second waveform to the network device, wherein a first power difference corresponding to the second waveform is a difference between a maximum transmit power of the terminal device when the second waveform is modulated using a first modulation scheme to which SS is added and a maximum transmit power of the terminal device when the second waveform is modulated using a second modulation scheme; or sending, by the terminal device, an additional power corresponding to the second waveform to the network device, wherein the additional power corresponding to the second waveform is a difference between a maximum transmit power of the terminal device when the second waveform is modulated using a first modulation scheme to which SS is added and a maximum transmit power of the terminal device when the second waveform is modulated using a first modulation scheme to which SS is not added.

8. A method, comprising:

performing the following:

obtaining, by a network device, first power headroom information, $\Delta_M$, and a second power difference, wherein the first power headroom information indicates power headroom of a terminal device when data is transmitted using a first waveform, $\Delta_M$ is equal to a difference between a first maximum power and a second maximum power, the first maximum power is a maximum power of the terminal device when data is transmitted using the first waveform, the second maximum power is a maximum power of the terminal device when data is transmitted using a second waveform, a type of the first waveform is different from a type of the second waveform, the second power difference is a difference between a first configuration transmit power and a second configuration transmit power, the first configuration transmit power is a power configured by the network device for the terminal device when a physical uplink shared channel (PUSCH) is transmitted using the first waveform, and the second configuration transmit power is a power configured by the network device for the terminal device when the PUSCH is transmitted using the second waveform;

calculating, by the network device, second power headroom information based on the first power headroom information, $\Delta_M$, and the second power difference, wherein the second power headroom information indicates power headroom of the terminal device when data is transmitted by using the second waveform; and performing, by the network device, scheduling on the terminal device based on the first power headroom information and the second power headroom information; or performing the following:

receiving, by a network device, first power headroom information and second power headroom information that are sent by a terminal device, wherein the first power headroom information indicates power headroom of the terminal device when data is transmitted using a first waveform, and the second power headroom information indicates power headroom of the terminal device when data is transmitted using a second waveform; and performing, by the network device, scheduling on the terminal device based on the first power headroom information and the second power headroom information.

9. The method according to claim 8, wherein:

obtaining, by the network device, the first power headroom information comprises:

receiving, by the network device, the first power headroom information sent by the terminal device; and obtaining, by the network device, $\Delta_M$ comprises:

receiving, by the network device, $\Delta_M$ sent by the terminal device, or obtaining, by the network device, preset $\Delta_M$.

10. The method according to claim 8, wherein:

the first waveform supports spectrum shaping (SS), and the method further comprises:

performing the following:

receiving, by the network device, first power difference information that corresponds to the first waveform and that is sent by the terminal device, wherein the first power difference information that corresponds to the first waveform is information of a first power difference corresponding to the first waveform, the first power difference corresponding to the first waveform is a difference between a maximum transmit power of the terminal device when the first waveform is modulated using a first modulation scheme to which SS is added and a maximum transmit power of the terminal device when the first waveform is modulated using a second modulation scheme; or receiving, by the network device, an additional power that corresponds to the first waveform and that is sent by the terminal device, wherein the additional power corresponding to the first waveform is a difference between a maximum transmit power of the terminal device when the first waveform is modulated using a first modulation scheme to which SS is added and a maximum transmit power of the terminal device when the first waveform is modulated using a first modulation scheme to which SS is not added; and performing, by the network device, scheduling on the terminal device based on the first power headroom information and the second power headroom information comprises:

performing, by the network device, scheduling on the terminal device based on the first power headroom information, the second power headroom information, and the first power difference information corresponding to the first waveform; or performing, by the network device, scheduling on the terminal device based on the first power headroom information, the second power headroom information, and the additional power corresponding to the first waveform; or the second waveform supports SS, and the method further comprises:

performing the following:

receiving, by the network device, first power difference information that corresponds to the second waveform and that is sent by the terminal device, wherein the first power difference information that corresponds to the second waveform is information of a first power difference corresponding to the second waveform, the first power difference corresponding to the second waveform is a difference between a maximum transmit power of the terminal device when the second waveform is modulated using a first modulation scheme to which SS is added and a maximum transmit power of the terminal device when the second waveform is modulated using a second modulation scheme; or receiving, by the network device, an additional power that corresponds to the second waveform and that is sent by the terminal device, wherein the additional power corresponding to the second waveform is a difference between a maximum transmit power of the terminal device when the second waveform is modulated using a first modulation scheme to which SS is added and a maximum transmit power of the terminal device when the second waveform is modulated using a first modulation scheme to which SS is not added; and performing, by the network device, scheduling on the terminal device based on the first power headroom information and the second power headroom information comprises:

performing, by the network device, scheduling on the terminal device based on the first power headroom information, the second power headroom information, and the first power difference information corresponding to the second waveform; or performing, by the network device, scheduling on the terminal device based on the first power headroom information, the second power headroom information, and the additional power corresponding to the second waveform.

11. The method according to claim 8, wherein before receiving, by the network device, first power headroom information and second power headroom information that are sent by a terminal device, the method further comprises:

determining, by the network device, configuration information, wherein the configuration information instructs the terminal device to report the first power headroom information and the second power headroom information within a preset time period; and sending, by the network device, the configuration information to the terminal device; and wherein receiving, by the network device, the first power headroom information and the second power headroom information that are sent by a terminal device comprises:

receiving, within the preset time period, the first power headroom information and the second power headroom information that are sent by the terminal device.

12. The method according to claim 11, wherein:
the first waveform supports spectrum shaping (SS), and the method further comprises:
performing the following:
receiving, by the network device, first power difference information that corresponds to the first waveform and that is sent by the terminal device, wherein the first power difference information corresponding to the first waveform is information of a first power difference corresponding to the first waveform, the first power difference corresponding to the first waveform is a difference between a maximum transmit power of the terminal device when the first waveform is modulated using a first modulation scheme to which SS is added and a maximum transmit power of the terminal device when the first waveform is modulated using a second modulation scheme; or
receiving, by the network device, an additional power that corresponding to the first waveform and that is sent by the terminal device, wherein the additional power corresponding to the first waveform is a difference between a maximum transmit power of the terminal device in case of the first waveform is modulated by using a first modulation scheme to which SS is added and a maximum transmit power of the terminal device in case of the first waveform is modulated by using a first modulation scheme to which SS is not added; and
performing, by the network device, scheduling on the terminal device based on the first power headroom information and the second power headroom information comprises:
performing, by the network device, scheduling on the terminal device based on the first power headroom information, the second power headroom information, and the first power difference information corresponding to the first waveform; or
performing, by the network device, scheduling on the terminal device based on the first power headroom information, the second power headroom information, and the additional power corresponding to the first waveform; or
the second waveform supports SS, and the method further comprises:
performing the following:
receiving, by the network device, first power difference information that corresponds to the second waveform and that is sent by the terminal device, wherein the first power difference information corresponding to the second waveform is information of a first power difference corresponding to the second waveform, a first power difference corresponding to the second waveform is a difference between a maximum transmit power of the terminal device when the second waveform is modulated using a first modulation scheme to which SS is added and a maximum transmit power of the terminal device when the second waveform is modulated using a second modulation scheme; or
receiving, by the network device, an additional power that corresponds to the second waveform and that is sent by the terminal device, wherein the additional power corresponding to the second waveform is a difference between a maximum transmit power of the terminal device when the second waveform is modulated using a first modulation scheme to which SS is added and a maximum transmit power of the terminal device when the second waveform is modulated using a first modulation scheme to which SS is not added; and
performing, by the network device, scheduling on the terminal device based on the first power headroom information and the second power headroom information comprises:
performing, by the network device, scheduling on the terminal device based on the first power headroom information, the second power headroom information, and the first power difference information corresponding to the second waveform; or
performing, by the network device, scheduling on the terminal device based on the first power headroom information, the second power headroom information, and the additional power corresponding to the second waveform.

13. A terminal device, comprising:
a transceiver;
a processor; and
a non-transitory computer-readable storage medium storing a program to be executed by the processor;
wherein the program includes instructions for:
determining first power headroom information and $\Delta_M$, wherein the first power headroom information indicates power headroom of the terminal device when data is transmitted using a first waveform, $\Delta_M$ is a difference between a first maximum power and a second maximum power, the first maximum power is a maximum power of the terminal device when data is transmitted using the first waveform, the second maximum power is a maximum power of the terminal device when data is transmitted using a second waveform, the terminal device supports the first waveform and the second waveform being used for data transmission, and a type of the first waveform is different than a type of the second waveform; and
sending, to a network device using the transceiver, the first power headroom information and $\Delta_M$; or
wherein the program includes instructions for:
determining first power headroom information and second power headroom information, wherein the first power headroom information indicates power headroom of the terminal device when data is transmitted using the first waveform, and the second power headroom information indicates power headroom of the terminal device when data is transmitted using the second waveform; and
sending, to a network device using the transceiver, the first power headroom information and the second power headroom information.

14. The terminal device according to claim 13, wherein an uplink channel of the terminal device is transmitted without using the first waveform, and the program includes instructions for:
when the uplink channel of the terminal device is transmitted using the second waveform, calculate the first power headroom information based on a scheduling parameter that is used when the uplink channel of the terminal device is transmitted using the second waveform.

15. The terminal device according to claim 14, wherein:
the first waveform supports spectrum shaping SS, and the program includes instructions for:
sending first power difference information corresponding to the first waveform to the network device, wherein the first power difference information corresponding to the first waveform is information of a first power difference corresponding to the first waveform, a first power difference corresponding to the first waveform is a difference between a maximum transmit power of the terminal device when the first waveform is modulated using a first modulation scheme to which SS is added and a maximum transmit power of the terminal device when the first waveform is modulated using a second modulation scheme; or
sending an additional power corresponding to the first waveform to the network device, wherein the additional power corresponding to the first waveform is a difference between a maximum transmit power of the terminal device when the first waveform is modulated using a first modulation scheme to which SS is added and a maximum transmit power of the terminal device when the first waveform is modulated using a first modulation scheme to which SS is not added; or
the second waveform supports SS, and the program includes instructions for:
sending first power difference information corresponding to the second waveform to the network device, wherein the first power difference information corresponding to the second waveform is information of a first power difference corresponding to the second waveform, the first power difference corresponding to the second waveform is a difference between a maximum transmit power of the terminal device when the second waveform is modulated using a first modulation scheme to which SS is added and a maximum transmit power of the terminal device when the second waveform is modulated using a second modulation scheme; or
sending an additional power corresponding to the second waveform to the network device, wherein the additional power corresponding to the second waveform is a difference between a maximum transmit power of the terminal device when the second waveform is modulated using a first modulation scheme to which SS is added and a maximum transmit power of the terminal device when the second waveform is modulated using a first modulation scheme to which SS is not added.

16. The terminal device according to claim 14, wherein the program further includes instructions for:
receiving, using the transceiver, configuration information sent by the network device, wherein the configuration information instructs to report the first power headroom information and the second power headroom information within a preset time period; and
sending, using the transceiver, the first power headroom information and the second power headroom information to the network device within the preset time period based on the configuration information.

17. The terminal device according to claim 14, wherein an uplink channel of the terminal device is transmitted without using the first waveform, and the program includes instructions for:
when the uplink channel of the terminal device is transmitted using the second waveform, calculate the first power headroom information based on a scheduling parameter when the uplink channel of the terminal device is transmitted using the second waveform.

18. The terminal device according to claim 17, wherein:
the first waveform supports spectrum shaping (SS), and the program further includes instructions for:
sending first power difference information corresponding to the first waveform to the network device, wherein the first power difference information corresponding to the first waveform is information of a first power difference corresponding to the first waveform, the first power difference corresponding to the first waveform is a difference between a maximum transmit power of the terminal device when the first waveform is modulated using a first modulation scheme to which SS is added and a maximum transmit power of the terminal device when the first waveform is modulated using a second modulation scheme; or
sending an additional power corresponding to the first waveform to the network device, wherein the additional power corresponding to the first waveform is a difference between a maximum transmit power of the terminal device when the first waveform is modulated using a first modulation scheme to which SS is added and a maximum transmit power of the terminal device when the first waveform is modulated using a first modulation scheme to which SS is not added; or
the second waveform supports SS, and the program further includes instructions for:
sending first power difference information corresponding to the second waveform to the network device, wherein the first power difference information corresponding to the second waveform is information of a first power difference corresponding to the second waveform, the first power difference corresponding to the second waveform is a difference between a maximum transmit power of the terminal device when the second waveform is modulated by using a first modulation scheme to which SS is added and a maximum transmit power of the terminal device when the second waveform is modulated using a second modulation scheme; or
sending an additional power corresponding to the second waveform to the network device, wherein the additional power corresponding to the second waveform is a difference between a maximum transmit power of the terminal device when the second waveform is modulated using a first modulation scheme to which SS is added and a maximum transmit power of the terminal device when the second waveform is modulated using a first modulation scheme to which SS is not added.

19. A network device, comprising:
a transceiver; and
a processor; and
a non-transitory computer-readable storage medium storing a program to be executed by the processor;
wherein the program includes instructions for:
obtaining first power headroom information, $\Delta_M$, and a second power difference, wherein the first power headroom information indicates power headroom of a terminal device when data is transmitted using a first waveform, $\Delta_M$ is equal to a difference between a first maximum power and a second maximum power, the first maximum power is a maximum power of the terminal device when data is transmitted using the first waveform, the second maximum power is a maximum power of the terminal device when data is transmitted using a second waveform, a type of the first waveform is different from a type of the second waveform, the second power difference is a difference between a first configuration transmit power and a second configuration transmit power, the first configuration transmit power is a power configured by the network device for the terminal device when a physical uplink shared channel (PUSCH) is transmitted using the first waveform, and the second configuration transmit power is a power configured by the network device for the terminal device when the PUSCH is transmitted using the second waveform; and calculating second power headroom information based on the first power headroom information, $\Delta_M$, and the second power difference, wherein the second power headroom information indicates power headroom of the terminal device when data is transmitted using the second waveform; and performing scheduling on the terminal device based on the first power headroom information and the second power headroom information; or wherein the program includes instructions for:

receiving first power headroom information and second power headroom information that are sent by a terminal device, wherein the first power headroom information indicates power headroom of the terminal device when data is transmitted using a first waveform, and the second power headroom information indicates power headroom of the terminal device when data is transmitted by using a second waveform; and performing scheduling on the terminal device based on the first power headroom information and the second power headroom information.

20. The network device according to claim 19, wherein:
the first waveform supports spectrum shaping (SS), and the program further includes instructions for:
performing the following:
receiving first power difference information that corresponds to the first waveform and that is sent by the terminal device, wherein the first power difference information that corresponds to the first waveform is information of a first power difference that corresponds to the first waveform, the first power difference corresponding to the first waveform is a difference between a maximum transmit power of the terminal device when the first waveform is modulated using a first modulation scheme to which SS is added and a maximum transmit power of the terminal device when the first waveform is modulated using a second modulation scheme; or receiving an additional power that corresponds to the first waveform and that is sent by the terminal device, wherein the additional power corresponding to the first waveform is a difference between a maximum transmit power of the terminal device when the first waveform is modulated using a first modulation scheme to which SS is added and a maximum transmit power of the terminal device when the first waveform is modulated using a first modulation scheme to which SS is not added; and wherein the program includes instructions for:
performing scheduling on the terminal device based on the first power headroom information, the second power headroom information, and the first power difference information corresponding to the first waveform; or performing scheduling on the terminal device based on the first power headroom information, the second power headroom information, and the additional power corresponding to the first waveform; or the second waveform supports SS, and the program further includes instructions for:
performing the following:
receiving first power difference information that corresponds to the second waveform and that is sent by the terminal device, wherein the first power difference information that corresponds to the second waveform is information of a first power difference that corresponds to the second waveform, the first power difference corresponding to the second waveform is a difference between a maximum transmit power of the terminal device when the second waveform is modulated using a first modulation scheme to which SS is added and a maximum transmit power of the terminal device when the second waveform is modulated using a second modulation scheme; or receiving an additional power that is corresponding to the second waveform and that is sent by the terminal device, wherein the additional power corresponding to the second waveform is a difference between a maximum transmit power of the terminal device when the second waveform is modulated using a first modulation scheme to which SS is added and a maximum transmit power of the terminal device when the second waveform is modulated using a first modulation scheme to which SS is not added; and wherein the program includes instructions for:
perform scheduling on the terminal device based on the first power headroom information, the second power headroom information, and the first power difference information corresponding to the second waveform; or perform scheduling on the terminal device based on the first power headroom information, the second power headroom information, and the additional power corresponding to the second waveform.

* * * * *